US011887427B2

(12) United States Patent
Shortell et al.

(10) Patent No.: US 11,887,427 B2
(45) Date of Patent: Jan. 30, 2024

(54) SECURITY PRINT MEDIA

(71) Applicant: DE LA RUE INTERNATIONAL LIMITED, Basingstoke (GB)

(72) Inventors: Matt Shortell, Basingstoke (GB); Emily Parker, Didcot (GB)

(73) Assignee: DE LA RUE INTERNATIONAL LIMITED, Basingstoke (GB)

( * ) Notice: Subject to any disclaimer, the term of this patent is extended or adjusted under 35 U.S.C. 154(b) by 48 days.

(21) Appl. No.: 17/634,743

(22) PCT Filed: Oct. 8, 2020

(86) PCT No.: PCT/GB2020/052483
§ 371 (c)(1),
(2) Date: Feb. 11, 2022

(87) PCT Pub. No.: WO2021/074591
PCT Pub. Date: Apr. 22, 2021

(65) Prior Publication Data

US 2022/0284753 A1 Sep. 8, 2022

(30) Foreign Application Priority Data

Oct. 15, 2019 (GB) ..................................... 1914921

(51) Int. Cl.
*G07D 7/207* (2016.01)
*B42D 25/29* (2014.01)
(Continued)

(52) U.S. Cl.
CPC ............. *G07D 7/207* (2017.05); *B42D 25/29* (2014.10); *B42D 25/351* (2014.10);
(Continued)

(58) Field of Classification Search
CPC ...... G07D 7/207; G07D 7/0043; B42D 25/29; B42D 25/351; B42D 25/382; B42D 25/387; B42D 25/455; B42D 25/46
See application file for complete search history.

(56) References Cited

U.S. PATENT DOCUMENTS

2007/0054067 A1 3/2007 Power
2010/0230615 A1* 9/2010 MacPherson .......... B42D 25/29 359/290
(Continued)

FOREIGN PATENT DOCUMENTS

EP 2028017 A2 2/2009
GB 2452078 A 2/2009
(Continued)

OTHER PUBLICATIONS

Apr. 17, 2020 Search and Examination Report issued in British Patent Application No. 1914921.0.
(Continued)

*Primary Examiner* — Laura A Gudorf
(74) *Attorney, Agent, or Firm* — Oliff PLC

(57) ABSTRACT

A security print medium for forming security documents therefrom, the security print medium comprising a core having opposing first and second sides. The core comprises a radiation-responsive substance distributed within the core across at least a first region of the core, the radiation-responsive substance being responsive to a predetermined input radiation by producing a predetermined output radiation. The security print medium further comprises a first encoding layer disposed on the first side of the core and a second encoding layer disposed on the second side of the core, each of the first and second encoding layers comprising an encoding material that modifies the intensity of the predetermined input radiation and/or the predetermined output radiation produced by the radiation-responsive sub-
(Continued)

stance transmitted through the respective encoding layer, wherein the first and second encoding layers overlap each other across the first region. The optical density of each of the first and second encoding layers varies across the first region in accordance with a predetermined pattern, the predetermined pattern defining one or more encoding features, such that when the security print medium is exposed to the predetermined input radiation, the output radiation detectable from one or each side of the security print medium varies across the first region in accordance with the one or more encoding features. The first and second encoding layers are configured such that when the security print medium is viewed in transmitted visible light, the intensity of visible light transmitted through the first encoding layer, the core and the second encoding layer in combination is uniform across the first region, such that the one or more encoding features is concealed.

25 Claims, 19 Drawing Sheets

(51) Int. Cl.
*B42D 25/351* (2014.01)
*B42D 25/382* (2014.01)
*B42D 25/387* (2014.01)
*B42D 25/455* (2014.01)
*B42D 25/46* (2014.01)
*G07D 7/0043* (2016.01)

(52) U.S. Cl.
CPC ......... *B42D 25/382* (2014.10); *B42D 25/387* (2014.10); *B42D 25/455* (2014.10); *B42D 25/46* (2014.10); *G07D 7/0043* (2017.05)

(56) References Cited

U.S. PATENT DOCUMENTS

| | | | |
|---|---|---|---|
| 2012/0038905 | A1 | 2/2012 | Balbuena |
| 2016/0125682 | A1 | 5/2016 | Rapoport et al. |
| 2016/0133078 | A1 | 5/2016 | Hussain et al. |
| 2018/0005551 | A1 | 1/2018 | Rancien et al. |

FOREIGN PATENT DOCUMENTS

| | | | |
|---|---|---|---|
| GB | 2542241 | A | 3/2017 |
| JP | 2017-220084 | A | 12/2017 |
| WO | 2014/006416 | A2 | 1/2014 |

OTHER PUBLICATIONS

Jan. 22, 2021 International Search Report issued in International Patent Application No. PCT/GB2020/052483.

Jan. 22, 2021 Written Opinion issued in International Patent Application No. PCT/GB2020/052483.

* cited by examiner

30

90a
102'
$C_1$
$C_2$
$C_1'$
$C_2'$
101
102

90b
104
103

30
102'
1a
1b
55
5
102
103
104
h 55
101
1a
1b
5a
5b
5
102
103

SECURITY PRINT MEDIA

FIELD OF THE INVENTION

The present invention relates to security print media suitable for use in making security documents such as banknotes, identity documents, passports, certificates, bank cards, identification cards, driving licences and the like, as well as methods for manufacturing security print media, security documents made from the security print media, and methods and apparatus for authenticating security documents made from the security print media.

BACKGROUND

To prevent counterfeiting and enable authenticity to be checked, security documents are typically provided with one or more security features which are difficult or impossible to replicate accurately with commonly available means, particularly photocopiers, scanners or commercial printers. Some types of security feature are formed on the surface of a document substrate, for example by printing onto and/or embossing into a substrate such as to create fine-line patterns or latent images revealed upon tilting, whilst others including diffractive optical elements and the like are typically formed on an article such as a security thread or a transfer foil, which is then applied to or incorporated into the document substrate. Also known are security features comprising substances which change appearance depending on the viewing conditions and/or are only detectable by machine rather than by the human eye. For instance, security features may include fluorescent or phosphorescent inks, which emit predictably wavelength(s) of radiation when excited, or absorbing inks, which may be visible under some wavelengths of light and not others.

A still further category of security element is that in which the security element is integrally formed by the document substrate itself, i.e. the medium of which the security document is made. A well-known example of such a feature is the conventional watermark made in fibrous (e.g. paper) substrates. Security elements such as watermarks which are integral to the document substrate have the significant benefit that they cannot be detached from the security document without destroying the integrity of the document.

Polymer document substrates, comprising typically a transparent or translucent polymer substrate with at least one opacifying layer applied on each side to receive print, or a stack of plastic films (e.g. laminated or co-extruded), have a number of benefits over conventional paper document substrates including increased lifetime due to their more robust nature and resistance to soiling. Polymer document substrates also lend themselves well to certain types of security features such as transparent windows and half-windows, which are more difficult to incorporate in paper-based documents. "Pseudo-watermarking" techniques have also been developed for forming features with similar appearances to those of conventional (paper) watermarks in polymer document substrates. However, beyond these features, techniques for forming security elements integrally in the substrate itself are currently limited. Instead, for polymer security documents, security elements are typically applied after the document substrate has been manufactured, for example as part of a subsequent security printing process line, or by the application of a foil.

Currently available security features integral to document substrates, such as watermarks, windows and pseudo-watermarks, rely for their security level only on the high barrier which exists to their accurate replication by would-be counterfeiters. It would be desirable to provide a security print medium—which can then be printed upon and/or otherwise processed into a security document—with an integral security feature of increased security level, to enhance the security of the document substrate itself, and ultimately of security documents formed from it.

SUMMARY OF THE INVENTION

A first aspect of the invention provides a security print medium for forming security documents therefrom, the security print medium comprising: a core having opposing first and second sides, the core comprising a radiation-responsive substance distributed within the core across at least a first region of the core, the radiation-responsive substance being responsive to a predetermined input radiation by producing a predetermined output radiation; a first encoding layer disposed on the first side of the core and a second encoding layer disposed on the second side of the core, each of the first and second encoding layers comprising an encoding material that modifies the intensity of the predetermined input radiation and/or the predetermined output radiation produced by the radiation-responsive substance transmitted through the respective encoding layer, wherein the first and second encoding layers overlap each other across the first region; wherein the optical density of each of the first and second encoding layers varies across the first region in accordance with a predetermined pattern, the predetermined pattern defining one or more encoding features, such that when the security print medium is exposed to the predetermined input radiation, the output radiation detectable from one or each side of the security print medium varies across the first region in accordance with the one or more encoding features, and the first and second encoding layers are configured such that when the security print medium is viewed in transmitted visible light, the intensity of visible light transmitted through the first encoding layer, the core and the second encoding layer in combination is uniform across the first region, such that the one or more encoding features is concealed.

By providing a radiation-responsive substance and encoding layers, arranged as specified above, the security print media is equipped with a more covert security feature which is not visible in transmitted light (unlike known substrate security features such as watermarks, windows and pseudo-watermarks). This is achieved through configuration of both encoding layers according to the same predetermined pattern in such a way that the total optical density provided by both encoding layers in combination with the core is substantially the same at every point across the first region. At the same time, the variation in optical density provided by either one of the encoding layers (without the other) across the first region enables the encoding feature(s) to be revealed when the security print media is examined under certain conditions—namely when the radiation-responsive substance is activated by appropriate input radiation and it is the output radiation which is being observed across the region. Thus the presence of the encoding feature is more hidden from view during usual handling, as compared with known integral security features, and more difficult for would-be counterfeiters to identify as an authenticator. Nonetheless, central banks and other authorities provided with appropriate apparatus for carrying out authentication (such as that disclosed below) can readily check for the presence of the encoding feature(s) and verify the nature of the feature to confirm that the document is authentic.

The first and second encoding layers are configured such that the encoding feature(s) are concealed when viewed at least in transmitted visible light in the manner defined above. Many of the configurations that give rise to this concealment, examples of which will be described below, will also naturally result in the encoding feature(s) being concealed when viewed in other wavelengths transmitted through the core and the first and second encoding layers. It should therefore be understood that throughout this specification, references to the encoding feature(s) being concealed when viewed in transmitted visible light (and indeed in reflected visible light, as is achieved by certain preferred embodiments, which will be discussed later) do not mean that the encoding feature(s) are necessarily concealed only when viewed in visible light, and these features may indeed be concealed when viewed in all wavelengths except under the specific conditions that give rise to the production of output radiation from the core as described above. This is preferred in order to better conceal the presence of the feature.

As discussed in more detail below, the narrower the waveband of wavelengths to which the radiation-responsive material will respond and which it may output, the more difficult it will be for a counterfeiter to detect the feature. This is because the presence of the pattern will only be detectable when the correct input radiation is used to illuminate the medium, and the result is observed in the correct output radiation waveband. The correct input and output wavebands (i.e. a matched pair of wavebands) therefore need to be identified in order to detect the feature and the narrower these are the more challenge this will present to a counterfeiter.

If the encoding material modifies the intensity of (e.g. attenuates) the predetermined input radiation transmitted through either encoding layer, the radiation-responsive material will produce the most output radiation at the positions in the core where the intensity of the input radiation that it receives is greatest. This will result in the output radiation produced by the core varying across the first region in accordance with the pattern. If, on the other hand, the encoding material modifies the intensity of (e.g. attenuates) the output radiation transmitted through the encoding layer in which it is present, the variation in the output radiation detectable on the respective side of the core will be a result of the transmission through the encoding layer. The encoding material may of course modify the intensity of both the input and output radiation transmitted through the encoding layers, in which case the variation in intensity of the output radiation on either side of the core may be affected by the interaction of the encoding material with both the input and output radiation.

Throughout this disclosure, the term "security print media" (or "security print medium") is used to refer to media (e.g. in the form of a sheet, web or roll) which can then be printed upon and/or otherwise processed to form the desired security document, in a manner analogous to the printing and subsequent processing of a conventional substrate. Hence "security print media" does not encompass graphics layers and the like, which are later printed onto the security print media to provide security patterns, indicia, denomination identifiers, currency identifiers, individualisation data, holder information etc. The combination of such a graphics layer and a "security print medium" (and optionally additional features such as applied foils, strips, patches etc.) is the "security document". The security print media could ultimately be used to form any type of security document, including banknotes, passports (or individual pages thereof), identification cards, certificates, cheques and the like.

The term "core" is used here to refer to everything existing between the first and second encoding layers. As described below, the core could be monolithic or could be formed of multiple layers, self-supporting, coating(s) or otherwise. The core could include primer layers or be otherwise modified to improve the retention of the encoding layers on each side thereof if necessary. It should be understood that the term "on" does not require direct contact between the integers mentioned, nor any particular orientation with respect to gravity.

"Optical density" is an absolute term, referring to the capacity of a particular sample of material to prevent (e.g. absorb or scatter) the transmission of light (inside or outside the visible spectrum). The term does not refer to a bulk property of the material. Thus, the optical density may depend for example on the thickness of the material at the point at which the optical density is measured. In the present disclosure, it is the optical density of the relevant layer(s) in the direction parallel to the normal to the security print media which is meant. The optical density of the first and/or second encoding layer can thus be arranged to vary across the first region for instance by varying the thickness of the encoding material and/or by utilising different encoding materials (with different transmission properties) in different locations. It should also be noted that, depending on the encoding material, the optical transmission may not be influenced by the local thickness of the material—for example, if the encoding material is opaque at a certain threshold thickness, then increasing the thickness beyond that will have a negligible effect on the optical transmission.

It should be understood that while the first and second encoding layers will both be arranged in accordance with the same predetermined pattern, this does not mean that the disposition of encoding material will be identical in each layer. Rather, the higher optical density pattern elements of the first encoding layer will typically be aligned with lower optical density pattern elements of the second encoding layer, and vice versa, so that the total optical density of the two layers in combination is constant. For example, the first encoding layer may be a "negative" of the second encoding layer, with or without a uniform offset amount added to one layer or the other across the first region.

As explained above, by concealing the encoding feature in transmitted visible light (preferably all transmitted lighting conditions other than the predetermined input radiation) via the technique already described, the security level is increased. However, in particularly preferred embodiments the security level is further increased by also arranging for the encoding feature(s) to be hidden in reflected visible light (and preferably, as explained above, in some or all wavelengths outside of the visible range), thus rendering the device entirely covert. Preferably, the one or more encoding features are concealed when the security print medium is viewed in reflected visible light from one or each side as a result of either (i) one or more concealing layers each arranged to conceal a respective one of the first and second encoding layers in reflected visible light, or (ii) the visual appearance of the core and one or both of the first and second encoding layers being configured such that the predetermined pattern is concealed when viewed in reflected visible light. If a concealing layer is used, this is located outboard of the encoding layer it is to hide (i.e. the encoding layer is between the concealing layer and the core) and configured so as to obscure the visibility of the encoding layer therethrough. If the visual appearance of the core and encoding layer is used instead to provide the concealment, this can be achieved in a number of different ways.

For instance, in some preferred implementations the visual appearance of the first encoding layer is configured to match the visual appearance of the core when viewed from the first side such that the one or more encoding features are concealed when the security print medium is viewed in reflected visible light from the first side; and/or the visual appearance of the second encoding layer is configured to match the visual appearance of the core when viewed from the second side such that the one or more encoding features are concealed when the security print medium is viewed in reflected visible light from the second side. The visual appearances can be considered "matched" for instance if they appear the same (e.g. have substantially the same visible colour) at least under standard white light illumination conditions. In such cases, the elements of encoding material forming the pattern cannot be visually distinguished from the underlying core (visible in the gaps between the elements) by an observer and hence the presence of the encoding feature is hidden in reflected visible light. The matching can be achieved, for example, by forming an outermost layer of the core of the same material as the encoding layer thereon. In this case the outermost layer and the encoding layer could be applied together or sequentially, potentially by the same application means.

If the visual appearance of the first and/or second encoding layer is not matched to that of the core, it is preferable that the core is transparent to visible light in the first region and the predetermined pattern is configured such that when the security print medium is viewed in reflected visible light the encoding material is visible at each position in the first region so as to conceal the predetermined pattern. This can be achieved for instance by matching the visual appearances of the materials forming the first and second encoding layers to one another, since one will be viewed through any gaps in the other and hence render the pattern elements non-distinguishable.

In particularly preferred embodiments, the security print medium further comprises a first concealing layer disposed on the first side of the core and/or a second concealing layer disposed on the second side of the core, the or each concealing layer comprising a semi-opaque material, wherein the or each concealing layer has a constant optical density across the first region and wherein the or each concealing layer overlaps the first and second encoding layers across the first region so as to conceal the encoding layers from at least one side of the security print medium when viewed in reflected visible light. Preferably the or each concealing layer is an opacifying layer. As already mentioned, the concealing layer(s) increase the security of the security print medium by making the encoding features more difficult to identify when the security print medium is viewed in reflected visible light. The concealing layers can also help to obscure the internal configuration of the security print medium, which may be desirable where covert security features (for example radio-frequency identification circuits) are present in the security print medium.

In some cases, the encoding material used to form one or both of the encoding layers is preferably the same material as the semi-opaque material comprised by the one or more concealing layers. In such embodiments the encoding features and the concealing features may be laid down on the security print medium together during the manufacture of the security print medium, for example by printing a layer of semi-opaque ink having increased ink coat weight at appropriate positions to define the encoding feature(s) in accordance with the predetermined pattern. Thus, in preferred embodiments, one or both of the first and second encoding layers is integral with a respective concealing layer.

Alternatively, the encoding features may be formed separately to the concealing layers. This could be the case if the encoding features are formed of a material, such as an absorbing ink, that is different to the semi-opaque material that forms the concealing layers, for example. Thus, in other preferred embodiments, the first and second encoding layers are each disposed between the core and the first and second concealing layers respectively. This results in the encoding features being obscured by the concealing layers, thus concealing the encoding features when the security print medium is viewed in reflected visible light.

As already mentioned, in particularly preferred embodiments, the sum of the optical densities of the first and second encoding layers is constant across the first region. This is not essential, however, since the optical density of the core could be arranged to vary across the first region so as to compensate for any differences in the sum of the optical densities of the first and second encoding layers at different positions in the first region (such that when the security print medium is viewed in transmitted visible light, the intensity of visible light transmitted through the first encoding layer, the core and the second encoding layer in combination is uniform across the first region, as required by the first aspect of the invention). However, configuring the core in this way will typically increase the difficulty of producing the security print medium, and it is thus preferable that the sum of the optical densities of the first and second encoding layers is constant across the first region. Most preferably, the optical density of the core is uniform across the first region (and typically the whole security print medium).

The encoding material forming the first and/or second encoding layer preferably scatters and/or absorbs the predetermined input radiation and/or the predetermined output radiation produced by the radiation-responsive substance. In practice, the encoding material(s) may also modify the intensity of other radiation wavelengths (i.e. outside the input/output wavebands) and in preferred cases the encoding material(s) have such effect on substantially all wavelengths of light (visible and non-visible), although the degree of attenuation (or other modification) may vary with the wavelength. Examples of materials that are suitable for use as the encoding material are well known, for example opacifying inks, light-absorbing inks (e.g. infra-red absorbing inks) and radiation-marked polymers (e.g. laser-marked polymers). Specific examples will be provided below. It is also possible to use more than one encoding material, either within a single encoding layer, or to form each respective encoding layer. In preferred embodiments, both encoding layers are formed of the same material(s).

In preferred embodiments, at one or more positions in the first region, the optical density of the first encoding layer or the second encoding layer is zero. This is preferable as it allows for a larger signal difference in the detected output radiation between different parts of the predetermined pattern and hence for the encoding feature to be more readily detectable. It is, however, not essential, as the optical density of one or both encoding layers may be non-zero across the entire first region.

The core is preferably substantially transparent to visible light (most preferably clear, with low optical scattering and visually colourless). However, the core may be made semi-opaque, for example by the inclusion of an opacifying material in the core.

The core could be monolithic (i.e. of a single layer). However, in preferred embodiments the core comprises a plurality of core sublayers that overlap one another across the first region. One advantage of this is that the parameters (e.g. dimensions, mechanical properties and optical properties) of the core may be controlled, for example, by the inclusion of multiple core sub-layers providing the desired properties. A further advantage is that one or more print-receptive core sub-layers could be provided as the outermost sub-layer or sub-layers of the core so as to allow the encoding features to easily be formed on the core. One or more of the core sublayers may comprise the radiation-responsive substance, or alternatively (or additionally), the radiation-responsive substance may be contained between two immediately adjacent ones of the core sublayers.

In preferred implementations, one or more of the core sublayers comprises a material having a visual appearance configured to match that of one or both of the first and second encoding layers (as mentioned above). Core sublayers of this kind can be arranged so as to be visible when the security print medium is viewed in reflected visible light from one or both sides so as to conceal the encoding features, as mentioned above. If the core sub-layers are partially opaque to visible light, they may also help to conceal the internal configuration of the core.

In some preferred embodiments, the first encoding layer and/or the second encoding layer is disposed partially or wholly within a respective optically transparent layer in accordance with the predetermined pattern. This can be advantageous as the pattern elements forming the encoding layer may have varying heights, which can reduce the adherence of any other layers (e.g. concealing layers) disposed on the encoding layers. The optically transparent layer can help to overcome this by providing a level surface on one or both sides of the encoding layer. This arrangement can also arise when the first encoding layer and/or the second encoding layer comprises a respective layer of radiation-markable (e.g. laser-markable) material having formed therein one or more pattern elements produced by irradiation of the radiation-markable material. The material being "radiation-markable" means that when the material is irradiated with a predetermined marking wavelength (or wavelengths), its appearance is permanently modified (e.g. blackened or foamed). This can be achieved using any source of radiation capable of producing the predetermined marking wavelength(s), most preferably a laser. The radiation-markable material may be formed as a planar film having flat, parallel sides, and the pattern elements can be producing by irradiating the radiation-markable material in accordance with the predetermined pattern. The markings can extend fully or partially through the thickness of the layer. In other, particularly preferred embodiments, one or both of the encoding layers are printed onto the core in accordance with the predetermined pattern, preferably by inkjet, intaglio, flexographic, lithographic or gravure printing. The encoding layers could alternatively be printed or otherwise formed on separate supports which are then affixed to each side of the core, or the encoding layers could be transferred from those supports onto the core.

In preferred embodiments, the security print medium further comprises one or more optically transparent layers that overlap the core and the first and second encoding layers across the first region. The encoding layers may alternatively define the exterior surfaces of the security print medium, or may (additionally or alternatively) be covered by concealing layers as described above. The optically transparent layers can protect the core and encoding layers, and can add strength and thickness to the security print medium.

In particularly preferred embodiments, the predetermined pattern includes elements of different optical density levels defining the encoding feature(s), the minimum lateral dimensions of the elements being greater than the thickness of the core, preferably at least 10 times the thickness of the core. Preferably, across the extent of each element in question, its optical density is constant. If the widths of the elements were comparable to the thickness of the core, the appearance of the security print medium when viewed in transmitted or reflected visible light would potentially be strongly dependent on the viewing angle. This is because the optical densities of the first and second encoding layers are configured to complement one another on opposite sides of core at each position in the first region, but when the security print medium is viewed at an oblique angle, the viewer's line of sight will intersect different positions in the two encoding layers. If, for example, the core is optically transparent, the viewer may be able to see through the core at oblique viewing angles. Setting the widths of the pattern elements to be greater than the thickness of the core mitigates this effect since it will result in most lines of sight at oblique angles intersecting matched encoding features on either side of the core.

In some preferred embodiments, the predetermined pattern is configured such that in the first region the optical density of the first and/or second encoding layer varies gradually along a continuum of optical density levels. In other preferred embodiments, the predetermined pattern is configured such that in the first region the optical density of the first and/or second encoding layer varies stepwise between at least two, preferably more, different discrete optical density levels. In particularly preferred implementations, the optical density across each pattern element is a respective one of the discrete optical density levels. It should be understood that the optical density of the first and second layers may vary discretely in some parts of the first region while varying continuously in others.

The predetermined pattern may be configured such that in the first region: the optical density of the first encoding layer varies between a first maximum optical density and a first minimum optical density; and the optical density of the second encoding layer varies between a second maximum optical density and a second minimum optical density.

In some preferred embodiments, the predetermined pattern defines an encoding feature in the form of alternating strips, the first encoding layer comprising an array of alternately arranged strip elements of the first maximum optical density and the first minimum optical density; and the second encoding layer comprising an array of alternately arranged strip elements of the second maximum optical density and the second minimum optical density. The optical density of each encoding layer thus alternates between its respective maximum and minimum in accordance with the arrangement of the strips in the pattern. The strips may be arranged in accordance with a machine-readable code, for example a one-dimensional barcode, that will appear in the predetermined output radiation output on either side of the security print medium as modified by the respective encoding layer. The width of each strip can be used to associate a value or digit to each strip. In more complex arrangements, the same principles could be extended to produce encoding features in the form of two-dimensional barcodes. In particularly preferred embodiments, the optical density of the first and/or second encoding layer varies discretely between immediately adjacent elements in the respective array.

In other cases, more than two discrete levels of optical density could be employed and utilised in arrangements similar to those just described to associate different values to different pattern elements. For example, if 10 different optical density values are provided, the numbers 0 to 9 can be encoded and information such as a serial number or other unique identified incorporated in the encoding feature.

Preferably the first minimum optical density is zero and/or the second minimum optical density is zero. As discussed above, having one or more areas in either encoding layer at which the optical density is zero is advantageous because these areas can more easily be distinguished (by the fact that they do not modify the intensity of the predetermined output radiation output on the respective side of the core) from those in which the optical density is non-zero.

In preferred implementations, the respective thickness of each of the first and second encoding layers varies in accordance with the predetermined pattern so as to provide the varying optical density of each of the first and second encoding layers. The varying optical density can thus be achieved by, for example, depositing a material (such as an ink) that absorbs and/or scatters the predetermined input radiation and/or the predetermined output radiation across the first region on either side with a thickness that varies in accordance with the predetermined pattern (so as to convey the desired encoding feature). In alternative embodiments the variation in optical density could be achieved by forming different parts of the encoding layer of different materials each having a different optical density, or by modifying the properties of the encoding material across the first region in accordance with the predetermined pattern. These alternatives are, however, more difficult and time-consuming to achieve than simply varying the thickness of a homogenous encoding material. In particularly preferred embodiments, the sum of the thickness of the first encoding layer and the thickness of the second encoding layer is constant across the first region. If the optical density of the core is uniform, this will achieve the desired concealment of the encoding feature (s) in visible transmitted light.

As mentioned above, it is desirable that the radiation-responsive substance operates in narrow wavebands (and preferably is present at a low concentration), in order that its presence and the predetermined pattern is more difficult for a counterfeiter to detect. This also makes it more difficult for a counterfeiter to replicate the effect with more readily available materials, which tend to be responsive (and emit) across broader wavebands. Hence, preferably, the predetermined input radiation to which the radiation-responsive substance is responsive and/or the predetermined output radiation produced by the radiation-responsive substance has a waveband of no more than 300 nm, preferably no more than 100 nm, more preferably no more than 50 nm, most preferably no more than 10 nm. Advantageously, the predetermined input radiation to which the radiation-responsive substance is responsive and/or the predetermined output radiation produced by the radiation-responsive substance are outside the visible spectrum. As noted above, it is also preferable that the radiation-responsive material is present at a low concentration in the core, to make it difficult or impossible for a counterfeiter to identify what material is present from an optical transmission spectra. Thus, it is preferable that the concentration of the radiation-responsive substance in the core is less than 1000 parts per million (ppm) by weight, preferably less than 600 μm and more preferably less than 400 ppm. These values relate to the core as a whole, so in embodiments where the core comprises multiple sub-layers, these preferred concentration values include both the sub-layer(s) containing the taggant and any in which the taggant is absent (in combination). Substances with a narrow input and/or output waveband are particularly well suited to deployment at low concentrations (for instance, there may be less influence of signal "noise" from other radiation sources).

In preferred implementations the radiation-responsive substance is a luminescent substance, preferably a phosphorescent substance, a fluorescent substance, or a substance that interacts with the predetermined input radiation by Raman scattering. More than one such radiation-responsive substance may be used. A substance that is "fluorescent" will begin to emit that predetermined output radiation almost instantly once irradiated with the predetermined input radiation, and will cease to do so almost as soon as the predetermined input radiation is removed. A substance that is "phosphorescent" will begin to emit the predetermined output radiation more slowly than a luminescent material, but may continue to emit the predetermined output radiation after the predetermined input radiation has been removed. "Raman scattering" refers to the inelastic scattering of photons (e.g. in the predetermined input radiation) by matter (e.g. atoms or molecules in the radiation-responsive substance in the core), which results in the energy of the photons being decreased or increased. A radiation-responsive substance that gives rise to this effect thus produces an output radiation having a frequency, or range of frequencies, lower or higher than that of the predetermined input radiation. Examples of suitable radiation-responsive substances will be given below.

In preferred implementations the predetermined output radiation comprises infra-red radiation. However, the predetermined output radiation may comprise other wavelengths in addition, or alternatively, to those in the infra-red, depending on the choice of radiation-responsive substance.

In particularly preferred embodiments the predetermined input radiation to which the radiation-responsive substance is responsive comprises a plurality of input wavelengths; and/or the predetermined output radiation produced by the radiation-responsive substance in response to the predetermined input radiation comprises a plurality of output wavelengths. These embodiments can be particularly difficult to counterfeit since they can be configured to be authenticated based on the different patterns in the intensity of the predetermined output radiation that appear when the security print medium is irradiated with different input wavelengths and/or observed at different output wavelengths. Most preferably, the predetermined output radiation produced by the radiation-responsive substance in response to the predetermined input radiation comprises a plurality of output wavelengths, and the first encoding layer and/or the second encoding layer modifies the intensity of a first of the plurality of output wavelengths but does not modify, or differently modifies, the intensity of a second of the plurality of output wavelengths; and, alternatively or additionally, the predetermined input radiation comprises a plurality of input wavelengths, and the first encoding layer and/or the second encoding layer modifies the intensity of a first of the plurality of input wavelengths but does not modify, or differently modifies, the intensity of a second of the plurality of input wavelengths. The security print medium can thus be authenticated based on whether one particular wavelength or wavelengths are modified differently to another wavelength or wavelengths. For example, if the encoding material scatters or absorbs a first output wavelength but not a second output wavelength, the encoding feature will be detectable when the media is observed in the first output wavelength but not when observed in the second. Similarly, if the encoding material scatters or absorbs a first input wavelength but not a second input wavelength, then a variation in the predetermined output radiation could be detected while the security print medium is irradiated with the first input wavelength (since the excitation of the radiation-responsive substance would vary across the first region in accordance with the interaction between the first input wavelength and the encoding material) but would appear differently while the security print medium is irradiated with the second (and possibly would not be detectable at all in the latter scenario, if the encoding material did not interact with an output wavelength produced in response to the second input wavelength).

Advantageously, the security print medium further comprises, in the first region, one or more print features each disposed on: the first side of the core, the first encoding layer and, if provided, the first concealing layer, being located between the first print feature and the core; or on the second side of the core, the second encoding layer and, if provided, the second concealing layer, being located between the second print feature and the core. As a result of this arrangement, the print feature(s) will be visible on their respective sides of the core (unless any additional visually opaque layers are provided over the print features, which is undesirable). Thus, preferably each of the one or more print features is configured to be visible when viewed in reflected visible light from the respective side of the core on which it is disposed. The print feature(s) may, for example, be in the form of one or more images, alphanumeric characters, symbols, logos, barcode, patterns and the like.

In some preferred implementations, the one or more print features preferably each comprise a material that absorbs and/or scatters the predetermined input radiation and/or the predetermined output radiation. This may result in the intensity of the predetermined output radiation output on one or both sides of the security print medium being modified in accordance with the print feature(s).

However, in particularly preferred implementations, the predetermined pattern (according to which the encoding layers are configured) further defines, in the first region, a compensating feature, wherein the compensating feature is configured to compensate for the print feature(s) such that the predetermined output radiation transmitted through the first encoding layer and the print feature (located on the same side as the first encoding layer) does not vary in accordance with the print feature. To say that the compensating feature "compensates" for a print feature means that the compensating feature modifies the intensity of the predetermined input radiation and/or predetermined output radiation transmitted through it across the first region such that the intensity of the predetermined input radiation transmitted to the core and/or the predetermined output radiation output by the core and transmitted through the print feature is modified in the same way as that output elsewhere across the first region. This can be achieved, for example, by shaping the compensating feature as the negative of the print feature (i.e. such that the compensating feature is present at each position in the first region not covered by the print feature, but not at positions that are covered by the print feature). This results in the print feature (and not the encoding feature) being visible when the security print medium is viewed in visible light, but the encoding feature (and not the print feature) being visible when the security print medium is viewed in the predetermined output radiation output on the respective side.

It should be noted that, where a compensating feature is deployed, the predetermined pattern according to which the first and second encoding layers are arranged defines both the compensating feature and the encoding feature. The transmissivity of the two encoding layers and the core (in combination) to visible light must still be uniform across the first region and so the presence of the compensating feature will be reflected in both encoding layers. As before, at a point where the first encoding layer is of higher optical density (due to the encoding feature or the compensating feature or both) relative to its surroundings, the second encoding layer will be of lower optical density relative to its surroundings and vice versa.

Most preferably, one or more encoding features overlap the compensating feature in the first region. This results in the print feature being visible when the security print medium is viewed in reflected visible light, but, at the same position, the overlapping encoding feature being visible when the security print medium is viewed in the predetermined output radiation output on the side on which the print feature in question is disposed.

Where the predetermined pattern defines both a compensating feature and an encoding feature, the elements forming each may comprise the same encoding material which is advantageous since each encoding layer can then be laid down in a single step if desired. Alternatively, pattern elements defining the encoding feature could be formed of a different encoding material from pattern elements defining the compensating feature if desired. For instance the encoding material defining the compensating feature could be formed of the same material as the print feature, to help ensure uniformity of optical density.

In other preferred implementations the first print feature and/or the second print feature substantially does not scatter or absorb (i.e. is substantially transparent to) the predetermined input radiation and the predetermined output radiation. In this way, the print feature may be configured independently of the encoding layers.

Optionally, the security print medium may further comprise a second region laterally offset from the first region, wherein the optical density of the security print medium varies within the second region. The second region may, for example, comprise one or more of a watermark, a half window and a full window. The predetermined pattern that defines the encoding feature(s) in the first region may also define encoding features in the second region, but in such a way that the encoding features in the second region are visible when the security print medium is viewed in transmitted and/or reflected visible light. This could be achieved by, for example, providing pattern elements on only one side of the core in the second region, or by setting the visual appearance of the pattern elements in the second region to be in contrast with that of the core. Such implementations are desirable since effectively two different integral security features (one visible in transmitted light and the other not) can be formed in a single process.

The security print medium preferably further comprises a machine-readable circuit disposed in the first region, most preferably a radio frequency identification (RFID) circuit. The machine-readable circuit may, for example, be embedded in a layer that overlaps the positions of the encoding feature(s) in the first region. The machine-readable circuit may store information (for example a serial number unique to the security print medium or security document in which it is contained, or a number or other such information that is stored on all security documents produced from the security print medium, e.g. a batch identifier) that can be used to authenticate the document, and this information may be related to information that is encoded in the encoding layers. The security print medium (and a security document formed therefrom) may thus be authenticated by comparing variations in the predetermined output radiation output on one or both sides to the information stored on the machine-readable circuit.

In preferred embodiments the predetermined pattern is configured so as to define in one or both of the first and second encoding layers one or more encoding features, each encoding feature preferably comprising one or more of an image, an alphanumeric digit or sequence, and a machine-readable code, the machine-readable code preferably comprising a (one-dimensional or two-dimensional) barcode and/or a multi-bit code. The authenticity of the security print medium and/or a security document made therefrom may thus be confirmed or refuted based on the encoding feature that is revealed, in the predetermined output radiation, when the security print medium is irradiated with the predetermined input radiation. The encoded pattern or patterns may, for example, represent a unique serial number of the security print medium or a security document to be formed therefrom, or a code which is common to all documents of a particular type (e.g. denomination or batch).

The present invention also provides a security document substrate comprising a security print medium as defined above, wherein the security document substrate is a banknote substrate, a passport substrate or a card substrate.

Also provided is a security document comprising a security print medium as defined above, for example a banknote, a passport or a card (e.g. an identity card, bank card or driver's license).

A second aspect of the invention provides a method of manufacturing a security print medium, the method comprising: (a) providing a core having opposing first and second sides, the core comprising a radiation-responsive substance distributed within the core across at least a first region of the core, the radiation-responsive substance being responsive to a predetermined input radiation by producing a predetermined output radiation; and (b) disposing a first encoding layer on the first side of the core and disposing a second encoding layer on the second side of the core, each of the first and second encoding layers comprising an encoding material that modifies the intensity of the predetermined input radiation and/or the predetermined output radiation produced by the radiation-responsive substance transmitted through the respective encoding layer, wherein the first and second encoding layers overlap each other across the first region; wherein the optical density of each of the first and second encoding layers varies across the first region in accordance with a predetermined pattern, the predetermined pattern defining one or more encoding features, such that when the security print medium is exposed to the predetermined input radiation, the output radiation detectable from one or each side of the security print medium varies across the first region in accordance with the one or more encoding features, and the first and second encoding layers are configured such that when the security print medium is viewed in transmitted visible light, the intensity of visible light transmitted through the first encoding layer, the core and the second encoding layer in combination is uniform across the first region, such that the one or more encoding features are concealed.

The method results in a security print medium having all the benefits described with respect to the first aspect of the invention. Any of the preferred features described in connection thereto may also be provided in corresponding preferred implementations of the method.

The first and second encoding layers may be disposed on the core in a variety of ways. For example, the first and second encoding layers may be printed on the core, laminated with the core (for example by the application of heat and/or pressure while in contact with the core) or joined to the core using an adhesive. In general, step (a) may involve any process that results in two encoding layers as defined above being disposed on either side of the core. For example, in some embodiments the encoding layers may be formed of a material that can be modified (e.g. by the application of radiation) in accordance with the predetermined pattern so as to vary its optical density, and the modification of the material may be performed only after the material to be modified has been placed on the core.

Step (a) preferably comprises producing the core. As explained above, the core may comprise a single layer or a plurality of core sublayers, which may be manufactured by various processes in order to achieve a variety of configurations. Alternatively, the method may begin at step (a) by providing a pre-made core, for example.

In preferred implementations, step (b) comprises: printing the first and/or second encoding layers in accordance with the predetermined pattern, preferably by an inkjet, intaglio, flexographic, lithographic or gravure process; and/or providing a radiation-markable material and irradiating the radiation-markable material in accordance with the predetermined pattern. As mentioned previously, these techniques could be performed directly on the core, or could be performed on separate supports and then transferred to or affixed to the core. It should be understood that each encoding layer may be obtained by a different respective process, provided that the requirement that the combined optical densities of the first and second encoding layers and the core is uniform across the first region. Hence, one encoding layer could be produced by printing on the core and the other by marking a radiation-markable material, for example. In step (b) the first and second encoding layers are preferably applied to the core in register with one another. The first and second encoding layers could for instance be applied simultaneously to opposite sides of the same position on the core, e.g. using a Simultan printing press.

A third aspect of the invention provides a method of authenticating a security document comprising a security print medium according to the first aspect of the invention, the method comprising: (a) irradiating the first region of the security document with the predetermined input radiation from a first side of the security document; (b) detecting from the first side and/or a second side the predetermined output radiation output by the radiation-responsive substance; and (c) identifying a variation in the detected output radiation.

Steps (a) and (b) need not be performed simultaneously. For example, some radiation-responsive substances (e.g. those comprising phosphorescent compounds) may begin, or continue, to emit the predetermined output radiation after they cease to be irradiated with the predetermined output radiation. Alternatively, steps (a) and (b) may be performed simultaneously, i.e. such that the output radiation is detected while the security print medium is irradiated with the predetermined input radiation.

The predetermined output radiation can be detected or sensed in a variety of ways. If the predetermined output radiation comprises visible wavelengths, for example, then the detection may simply comprise visually observing the security print medium (with the naked eye) while or after being irradiated with the predetermined input radiation. It may also or alternatively involve sensing the predetermined output radiation with a detector, for example an electronic sensor such as a sensing device comprising one or more photodiodes that are sensitive to the predetermined output radiation. Step (b) may involve recording the predetermined output radiation (for example by measuring its intensity and storing the measured values), or may simply involve monitoring the output radiation using, for example, a sensor without recording it.

The variation in the output radiation may be identified in different ways in step (c). The identified variation can be used as the basis for a decision as to whether or not the document is authentic. In some cases, mere identification of any spatial variation in the intensity of the detected output radiation may be considered sufficient to authenticate the document. In other cases, identifying the variation may involve recognising the appearance of an expected pattern (e.g. one or more alphanumeric characters, symbols or images) without considering the relative or absolute differences in the brightness, intensity or other parameters of the output radiation. This may be the case in particular when the predetermined radiation is detected visually in order to provide an easy and reliable way of authenticating the security document. However, the security of the security document may be greater when it is authenticated on the basis of a quantitative analysis of the predetermined output radiation, and hence step (c) preferably comprises measuring a relative difference and/or an absolute difference between the intensity of the output radiation received from each of a plurality of locations in the first region. The absolute and/or relative differences could be determined by a processor in communication with a sensor used to detect the predetermined output radiation, for example. In particularly preferred embodiments the method thus comprises comparing the identified variation in the recorded output radiation to stored data. This could involve a comparison of intensity values (absolute or relative) with corresponding values stored in memory and/or a comparison of a recognised pattern with one or more expected patterns stored in memory.

In some preferred embodiments, step (a) comprises directing light from a broadband radiation source onto the first region of the security document through a first filter, the first filter permitting transmission of the predetermined input radiation. The term "filter" as used herein refers to any device that partially or completely inhibits the transmission of certain wavelengths therethrough relative to others, and so the first filter must inhibit the transmission of one or more wavelengths to a greater degree than it inhibits the predetermined input radiation. (The first filter may, of course, not inhibit the transmission of the predetermined input radiation at all.) The first filter may be thus be configured to inhibit transmission of wavelengths produced by the broadband radiation source other than the predetermined input radiation so as to prevent these reaching the security print security document (and thus being reflected towards the detector and giving rise to a false signal). This is particularly advantageous if the radiation source outputs radiation at wavelengths corresponding to the predetermined output radiation.

In preferred implementations, step (b) the output radiation is detected after passing through a second filter, the second filter permitting transmission of the predetermined output radiation. Again, a "filter" selectively inhibits the transmission of some wavelengths to a greater or lesser degree than others, so the second filter must inhibit the transmission of one or more wavelengths to a greater degree than it inhibits the predetermined output radiation. (The second filter may, of course, not inhibit the transmission of the predetermined output radiation at all.) This is particularly advantageous if predetermined output radiation is sensed using a sensor that is responsive to wavelengths other than those of the predetermined output radiation.

A fourth aspect of the invention provides apparatus for authenticating a security document comprising a security print medium in accordance with the first aspect of the invention, the apparatus comprising: a radiation source configured to irradiate a first side of the security document with the predetermined input radiation; and one or more detectors each configured to detect the predetermined output radiation output from on first and/or second side of the security document.

In some preferred embodiments, the radiation source is configured to produce, in use, a broadband spectrum of radiation comprising the predetermined input radiation. The radiation source in these preferred embodiments may be a lamp or flash-lamp, for example.

The apparatus preferably comprises a first filter arranged to filter radiation directed from the radiation source towards the security document in use, the first filter permitting transmission of the predetermined input radiation. For the reasons explained above, this is particularly advantageous where the radiation source produces a broadband spectrum of radiation.

The apparatus preferably comprises one or more second filters each arranged to filter radiation directed towards one or more respective sensors, each second filter permitting transmission of the predetermined output radiation. For the reasons explained above, this is particularly advantageous where the detector is sensitive to wavelengths other than those corresponding to the predetermined output radiation.

In preferred implementations the apparatus may comprise a processor in communication with the one or more detectors, the processor being configured to identify a variation in the detected output radiation. The processor may compute relative and/or absolute differences between the output radiation detected from two or more positions one or both sides of the security document, for example. Alternatively, the detector may be in communication with a display module, for example, which is configured to simply display a representation of the detected intensity (e.g. as a list of values or a graphical representation such as a graph) without computing the differences between any such values. In particularly preferred embodiments, the processor is configured to compare the detected output radiation to stored data. The stored data may include data corresponding to the predetermined pattern in accordance with which the encoding layers in the security document are configured, for example, and the comparison could include determining whether the identified variation matches the stored pattern. The results of the comparison can be used to generate an authentication pass/fail signal.

BRIEF DESCRIPTION OF THE DRAWINGS

Preferred embodiments of the invention will now be described with reference to the accompanying drawings, in which.

DETAILED DESCRIPTION

Figure 1:
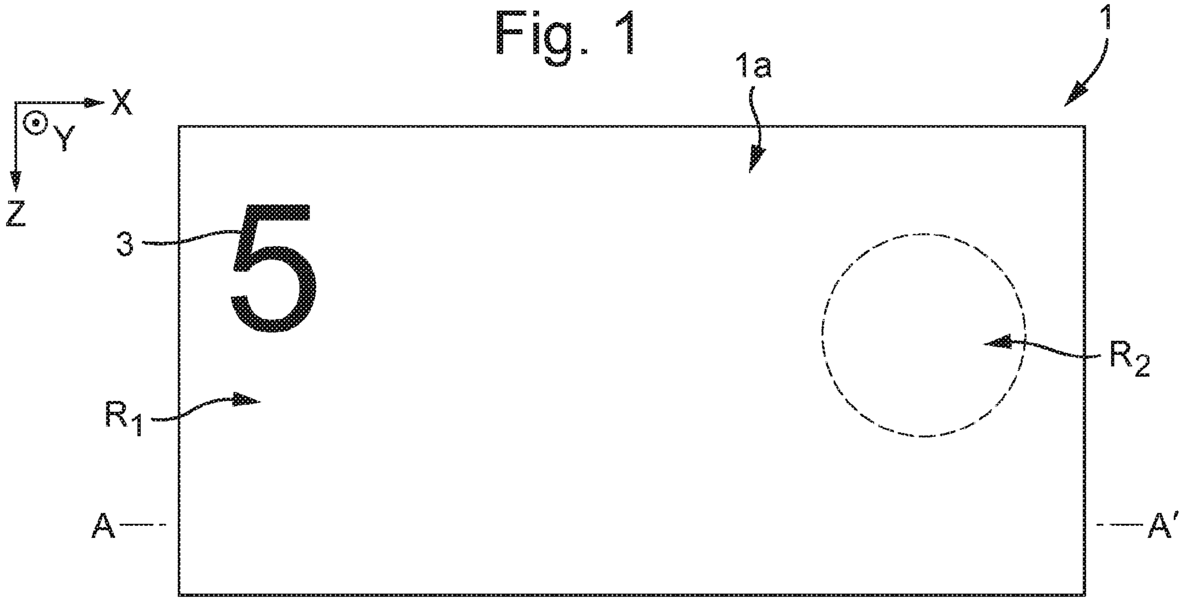
FIG. 1 shows an example of a security print medium in accordance with the first aspect of the invention in plan view.
Figure 2A:
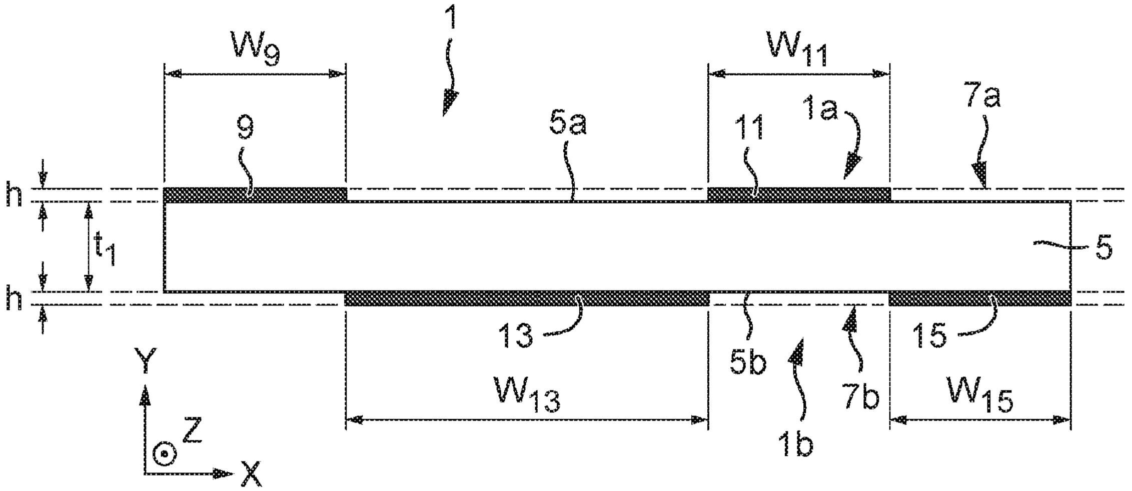
FIG. 2 shows (a) a cross-sectional view of a first embodiment of a security print medium in accordance with the first aspect of the invention, (b) a plan view of the security print medium shown in FIG. 2(*a*), (*c*) the security print medium of FIG. 2(*a*) while irradiated with a predetermined input radiation, and (d) the intensity of output radiation measured across the portion of the security print medium while irradiated as shown in FIG. 2(*c*)
Figure 2B:
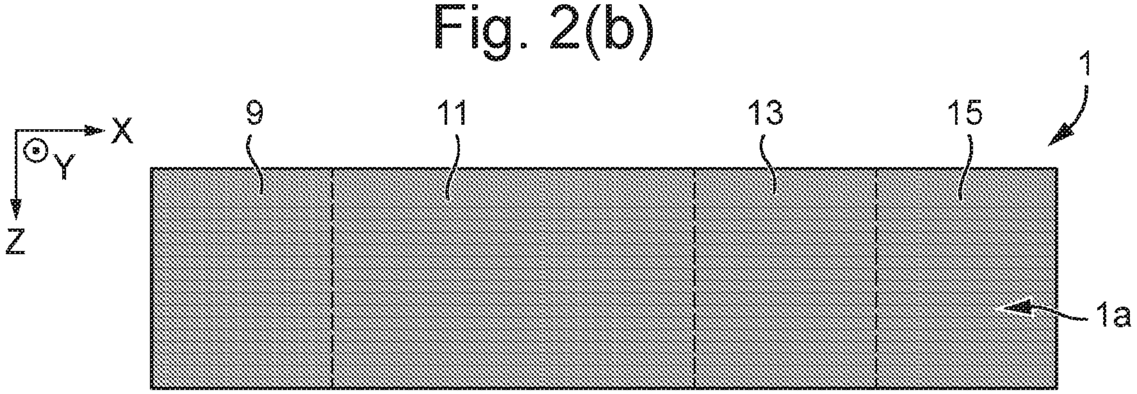
Figure 2C:
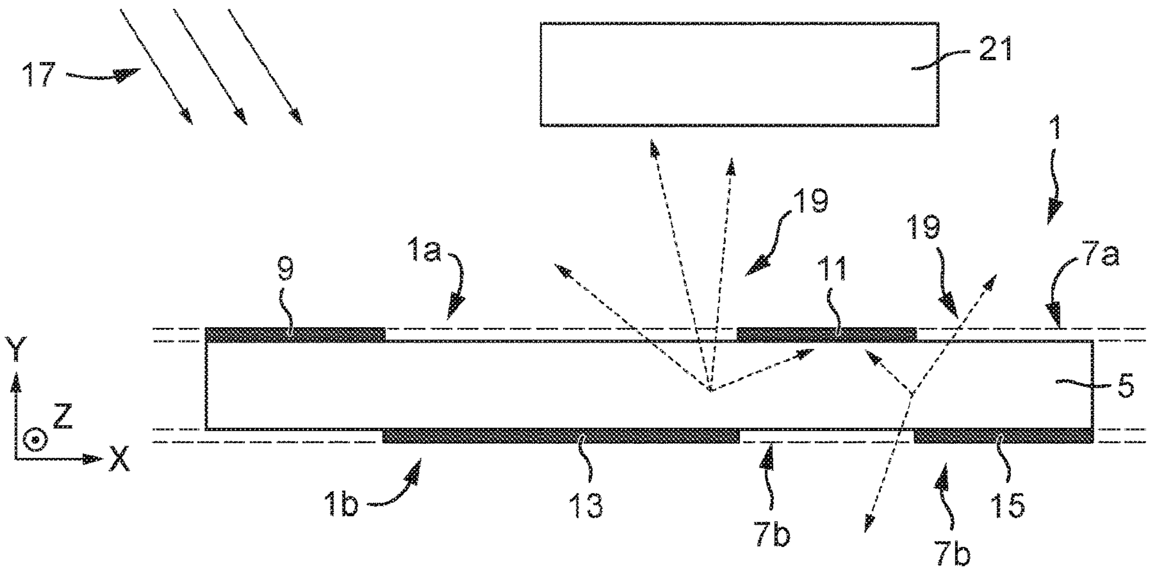
Figure 2D:
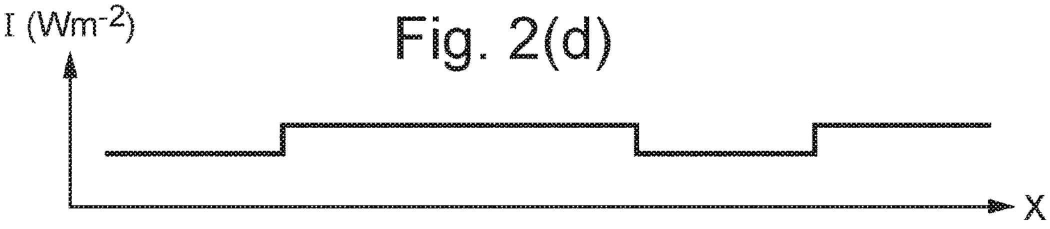

FIG. 1 shows an example of a security print medium 1 in accordance with the first aspect of the invention. The security print medium 1 is suitable for forming security documents therefrom, for example bank notes, passports or identity cards. For example, the security print medium may be a security document substrate (such as a banknote substrate or card substrate) which can be further processed, e.g. by printing, the application of security articles (such as threads, foils, patches and the like) thereto, etc., to form a security document. It will be appreciated that typically the security print medium will be provided in the form of a roll or sheet from which multiple such documents can be made. However, only a portion thereof corresponding to one document (a banknote, in this example) is depicted in FIG. 1.

Defined in the security print medium 1 is a first region $R_1$, across which at least a core and first and second encoding layers are present and overlap one another. In this example the security print medium 1 includes a second region $R_2$, laterally offset from the first region $R_1$, though this is not an essential feature. The security print medium 1 is also provided with a print feature 3, which is printed on a first side 1*a* of the security print medium 1.

FIG. 2(*a*) shows a cross-sectional view of a first region $R_1$ of an exemplary security print medium 1 in accordance with the first aspect of the invention. The cross sectional view shown in FIG. 2 could, for example, represent the structure of the security print medium of FIG. 1 along some or all of the line A-A' shown in FIG. 1.

The security print medium 1 includes a core 5. The core 5 contains a radiation-responsive substance dispersed through the core 5 at least across the first region $R_1$ that, when irradiated with a predetermined input radiation, produces a predetermined output radiation. The radiation-responsive substance could include, for example, a luminescent taggant that emits radiation with a predetermined output wavelength (e.g. infra-red) after being excited by radiation with a predetermined input wavelength (e.g. ultraviolet). The radiation-responsive substance could alternatively or additionally include a material that inelastically scatters the predetermined input radiation by the Raman effect so as to reduce or increase its energy. Examples will be provided below. The predetermined input radiation may include one or more wavelengths to which the radiation-responsive substance is responsive, and the predetermined output radiation may include one or more wavelengths output by the radiation-responsive substance in response to being irradiated with the predetermined output radiation.

In this example the core 5 could be substantially transparent to visible light, or could incorporate one or more non-transparent materials, for example in the form of one or more opacifying layers provided as sub-layers of the core 5. Examples of core constructions suitable for use in embodiments of the invention will be described later with reference to FIGS. 7(*a*) to 7(*f*) and 11(*a*) to 11(*f*).

On a first side 5*a* of the core 5 is disposed a first encoding layer 7*a*, and on a second side 5*b* of the core 5 is disposed a second encoding layer 7*b*. The first and second encoding layers 7*a*, 7*b* each comprise an encoding material that is disposed on the first and second sides 5*a*, 5*b* of the core 5 respectively. The encoding material in the encoding layers 7*a*, 7*b* is distributed in accordance with a predetermined pattern such that the first and second encoding layers 7*a*, 7*b* together define an encoding feature. In this example the encoding material is arranged in the form of discrete pattern elements 9, 11, 13, 15, together defining the encoding feature. Between the elements 9, 11 in the first encoding layer 7*a* there is no encoding material, and similarly between the elements 13, 15 in the second encoding layer 7*b* there is no encoding material (i.e. here the thickness, and optical density, of the respective encoding layer is zero).

The encoding material modifies the intensity of the predetermined input radiation incident on the security medium and/or the predetermined output radiation output by the radiation responsive substance in the core 5, for example by scattering and/or absorption of the input and/or output radiation (at least at some wavelengths of the input or output radiation, if either includes more than one wavelength). For example, if the radiation-responsive substance responds to the predetermined input radiation by producing infra-red radiation, the encoding material could be an infra-red absorbing ink. In other examples, the encoding material could include a semi-opaque opacifying material that scatters the predetermined output radiation so as to modify the intensity of the predetermined output radiation output on either side of the security print medium 1 at the positions of the pattern elements on the respective side. It should be noted that scattering materials can have complex effects on radiation, and while the encoding material in some embodiments will reduce the intensity of radiation transmitted therethrough, in others the composition and arrangement of the encoding material may be such that the intensity of the radiation is increased.

In some examples, where scattering-type encoding materials are used, the encoding material increases the intensity of the input and/or output radiation passing through it (at least initially) as the thickness of the encoding material is increased. In the simple case in which input radiation is directed towards the first side 1*a* only and the observation point is on side 1*a* also:

(i) as we increase the thickness of the encoding material on the second side 1*b* from zero, the observed intensity will increase rapidly with increasing thickness up towards a maximum and plateau. This is due to backscattering of the input light back into the core 5 increasing the likelihood that the input radiation is absorbed in the core 5 and backscattering of output radiation back into the core 5 towards the first side 1*a*; and (ii) as we increase the thickness of the encoding material on the first side 1*a* from zero, the observed intensity will increase initially, reach a maximum, then decrease again and eventually plateau towards a zero signal. The effect here is more complicated: the increase is due to forward scattering of the input radiation into the core 5, while the decrease is due to the backscattering of input radiation away from the core 5 and backscattering of output radiation back into the core 5.

Various examples of suitable core constructions and encoding layer configurations will be discussed later with reference to FIGS. 7(*a*) to 7(*f*) and 11(*a*) to 11(*f*). It should be understood that the term "core" is used throughout this disclosure to refer to everything located between the first and second encoding layers.

The dimensions of the pattern elements 9, 11, 13, 15, i.e. their thicknesses (height along the Y axis) and widths (along the X and Z axes), and their distribution within the first and second encoding layers, are defined by the predetermined pattern and used to convey an encoding feature, which here is an array of strips. The predetermined pattern is configured such that the optical density of the core 5 and first and second encoding layers 7*a*, 7*b* to visible light transmitted through them in combination along the Y axis is constant across the first region $R_1$. This means that at each position along the X axis shown in FIG. 2(*a*), the same fraction of visible light with which the security print medium 1 is irradiated from one side will be transmitted through the security print medium 1 along the Y axis to the other side. In this example, the pattern elements 9, 11, 13, 15 are each of the same thickness h and are formed of the same encoding material. At each position along the X axis there is either a pattern element present in the first encoding layer 7*a* or the second encoding layer 7*b*, but not both. As a result of this configuration, every line of sight through the security print medium along the Y axis (i.e. the normal to the security print medium) passes through the core and a uniform amount of encoding material so the optical density of the security print medium 1 is thus constant across the area shown. The pattern elements 9, 11, 13, 15, and hence the predetermined pattern itself, are thus concealed when the security print medium 1 is viewed in at least visible light transmitted through it along the Y axis (and preferably also in some invisible wavelengths).

While in this example the encoding layers 7*a*, 7*b* are formed of a single encoding material and the variation in optical density of each layer is the result of the arrangement of discrete elements 9, 11, 13, 15, the varying optical density of one or both encoding layers 7*a*, 7*b* could be achieved in other ways. For example, an encoding layer could comprise a plurality of encoding materials present at different positions within the layer (arranged, for example, as spaced pattern elements as shown in the present example, or contiguously such that encoding material is present at each position in the layer). It should also be understood that, while encoding layers 7*a*, 7*b* in this example each alternate between two discrete levels (i.e. being transparent where there is no encoding material in the respective layer and having a non-zero optical density at the positons of the pattern elements in the layer), the predetermined pattern may be configured so as to define any number of different optical density levels in each encoding layer 7*a*, 7*b*, which could be achieved, for example, by varying the thicknesses of the elements 9, 11, 13, 15 and/or incorporating a plurality of different encoding materials.

Each element 9, 11, 13, 15 has a respective width $w_9$, $w_{11}$, $w_{13}$, $w_{15}$ along the X axis. As discussed above, the lateral dimensions of the elements (i.e. along the Y and Z axes) are preferably greater than the thickness of the security print medium. Thus in this example the widths $w_9$, $w_{11}$, $w_{13}$, $w_{15}$ of the elements 9, 11, 13, 15 are each greater than the thickness $t_c$ of the core 5. This is particularly advantageous where the core 5 is optically transparent (i.e. clear and preferably colourless), since in such embodiments, when the security print medium is viewed from one side along a line of sight that is oblique to the normal (i.e. the Y axis), it may be possible to see the non-covered areas of the other side through the core. Setting the widths $w_9$, $w_{11}$, $w_{13}$, $w_{15}$ to be greater than the thickness $t_c$ of the core thus improves the concealment of the encoding features when viewed in reflected light.

If the core 5 is non-transparent and has an appearance (e.g. colour) different from that of the encoding material, in this example the predetermined pattern will be visible to an observer when viewing the security print media 1 from either side in reflected visible light. However, if the core 5 is substantially transparent to visible light, the elements 9,

11, 13, 15 are also concealed when the security print medium is viewed in reflected visible light since at each position along the X axis the viewer will see either the elements 9, 11 that are disposed on the first side 5*a* of the core 5 or the elements 13, 15 that are on the second side 5*b*. This is true whether the security print medium is viewed with its first side 1*a* or its second side 1*b* facing towards the viewer. This further improves the security of the security print medium and any security document(s) formed therefrom, because the presence of the predetermined pattern is concealed and hence the feature is covert. The elements could alternatively be concealed in reflected visible light by matching the visual appearance of the first side 5*a* and/or second side 5*b* of the core to that of the elements 9, 11, 13, 15. For example, the core could incorporate a pigment that is visually similar to the encoding material, or could include one or more sub-layers of uniform thicknesses comprising the same encoding material.

FIG. 2(*b*) shows a plan view of the region of the security print medium 1 shown in FIG. 2(*a*) when viewed along the direction Y from the first side 1*a* in reflected or transmitted visible light. Dashed lines indicate the edges of the elements 9, 11, 13, 15, but these would not be seen by the viewer. The area appears uniform and no encoding feature is observed.

FIG. 2(*c*) illustrates the security print medium of FIG. 2(*a*) while irradiated with the predetermined input radiation 17. In this example the predetermined input radiation is directed onto the first side of the security print medium 1. The predetermined input radiation 17 could be provided by any light source that is capable of producing radiation comprising the wavelengths to which the radiation-responsive substance is responsive, for example a narrow-band source such as a laser or light-emitting diode (LED), or a broad-band source such as a lamp or flash-lamp. An example of a suitable apparatus which could be used will be described with reference to FIG. 14 below.

When the radiation-responsive substance in the core 5 is irradiated with the predetermined input radiation 17, it outputs a predetermined output radiation 19. As explained above, each of the input radiation 17 and the output radiation 19 may comprise one or several respective wavelengths. A detector 21 is positioned to detect output radiation 19 output on the first side 1*a* of the security print medium 1, and in this example the detector 21 is configured to sense the intensity I of the output radiation 19 at each position along the X axis.

Examples of the trajectories of the output radiation 19 originating at different locations in the core are indicated by dashed arrows in FIG. 2(*c*). Some of the output radiation 19 is incident on the pattern elements 9, 11, 13, 15 in the encoding layers 7*a*, 7*b* and is absorbed and/or scattered, while some travels out of the core along trajectories that are not intercepted by the elements 9, 11, 13, 15. As a result, the intensity I measured by the detector 21 at positions along the X axis at which the elements 9, 11 on the first side 5*a* of the core are located is different to that measured at the intervening positions. Although not shown here, the pattern elements 9, 11, 13, 15 may additionally or alternatively absorb and/or scatter the input radiation 17, which would lead to the radiation-responsive material in the core 5 producing the predetermined output radiation with an intensity that varies across the core 5 (with the most output radiation being produced where the intensity of the received input radiation is greatest). This is an option in all embodiments.

FIG. 2(*d*) shows the intensity I measured by the detector 21 of FIG. 2(*c*) as a function of position along the X axis in the portion of the security print medium 1 illustrated. The measured intensity I is greater where pattern elements 9, 11 of the first encoding layer 7*a* are not present on the first side 5*a* of the core 5, and is reduced where the pattern elements 9, 11 are present. (As explained above, although in this example the encoding material is configured and arranged so as to reduce the intensity of the predetermined output radiation transmitted through it, in other examples the intensity of the predetermined output radiation transmitted through the encoding material may be increased.) The encoding layer 7*a* thus gives rise to a detectable variation, corresponding to the aforementioned encoding feature, in the radiation output on the first side 1*a* of the security print medium 1, which is determined by the predetermined pattern in accordance with which the first and second encoding layers 7*a*, 7*b* are configured. The variation in the measured intensity I may be used to authenticate the security print medium or any security documents formed therefrom. As the second encoding layer 7*b* is configured as the negative of the first encoding layer 7*a* (i.e. the second encoding layer 7*b* includes a low optical density element, a gap, at each position where the first encoding layer 7*a* has a high optical density pattern element, and vice versa), the intensity of output radiation from the second side 1*b*, if measured, would be found to vary in accordance with the same pattern as that detected the first side 1*a*.

It should be noted that while the predetermined input radiation 17 in this example is directed towards the security print medium 1 from its first side 1*a*, under some configurations the same pattern in the intensity I of the output radiation 19 may be observed if the security print medium 1 were irradiated with the predetermined input radiation 17 from its second side 1*b*, or from both the first and second sides 1*a*, 1*b*. This would be the case if the encoding material does not interact with the predetermined input radiation 17.

If the encoding material does scatter and/or absorb both the predetermined input radiation 17 and the predetermined output radiation 19, however, then the observed pattern may be significantly weaker when measured the first side 1*a* while the security print medium 1 is irradiated from only the second side 1*b*, or vice versa. This is because the production of the output radiation would be strongest where the most input radiation is received (in this example where the pattern elements 13, 15 are not present on the irradiated side, provided that the second encoding layer 7*b* is configured such that the encoding material reduces the intensity of the input radiation passing through it) but at the corresponding positions on the first side 1*a*, the modification of the intensity of the output radiation would be greatest, since this is where the pattern elements 9, 11 in the first encoding layer are positioned. In effect, the pattern elements 9, 11 on the first side 1*a* would modify the intensity of the output radiation in such a way that compensates for the variation in the quantity produced at different positions across the core.

If the security print medium 1 were irradiated from both the first and second sides 1*a*, 1*b*, then the magnitude of the variation in the output radiation measured on either side may also be reduced in comparison to the arrangement where the security print medium 1 is irradiated from one side only and the output is measured on the same side. This is because the complementary configuration of the first and second encoding layers 7*a*, 7*b* would allow the input radiation to reach the core without modification on one side where it is impeded by the encoding material on the other, thus causing the core 5 to receive a uniform intensity of the input radiation across the first region and hence negating the increase in contrast provided as a result of the modification of the input radiation.

While the examples described below describe the intensity of the predetermined output radiation being modified by the encoding material, it should be understood that in each example the encoding material could be configured to modify the intensity of either one or both of the predetermined input radiation and the predetermined output radiation.

Figure 3A:
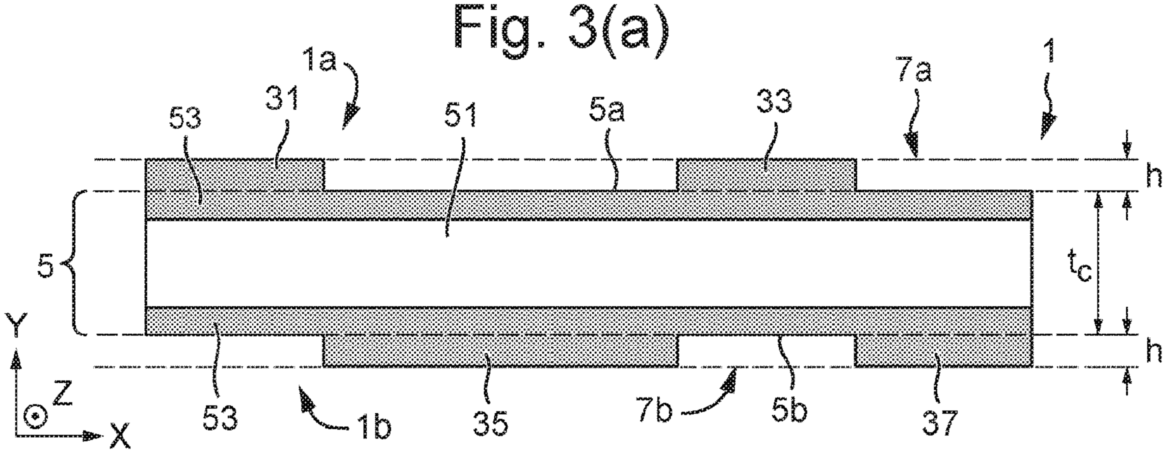
FIG. 3 shows (a) a cross-sectional view of a second embodiment of a security print medium in accordance with the first aspect of the invention, and (b) the intensity profile of radiation output by the security print medium shown in FIG. 3(*a*)
Figure 3B:
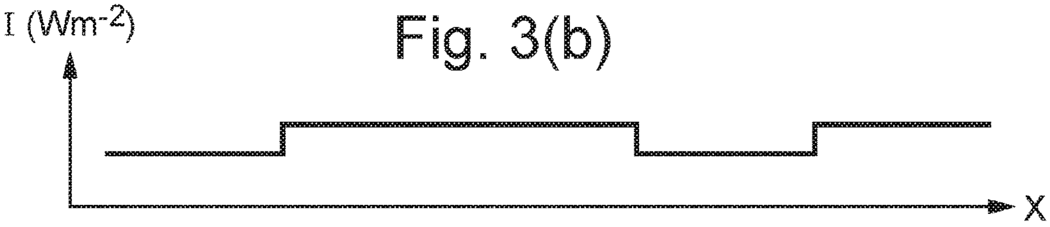

FIG. 3 shows a cross-sectional view of a second example of a security print medium in accordance with the first aspect of the invention. This cross-section could, for example, represent the part of the security print medium 1 through which the line A-A' shown in FIG. 1 passes.

The security print medium 1 includes a core 5, which in this example includes a first core sub-layer 51 and two opacifying core sub-layers 53 which are disposed on either side of sub-layer 51. Each opacifying sub-layer 53 is formed of a semi-opaque material that scatters visible light, examples of which are well-known to those of ordinary skill in the art, and which may be applied by printing or coating, for example. The first core sub-layer includes a radiation-responsive substance as described above with reference to FIG. 2(*a*). It should be noted that, although the first core sub-layer 51 is illustrated as a single layer in this example, the core 5 could include one or more additional core sub-layers such as those shown in FIGS. 7(*a*) to 7(*f*) and/or additional opacifying sub-layers. The opacifying core sub-layers 53 in this example are the outermost sub-layers of the core 5 and thus define the first side 5*a* and second side 5*b* of the core 5.

The security print medium 1 again includes a first encoding layer 7*a* and a second encoding layer 7*b*, which are configured in accordance with a predetermined pattern and which include elements 31, 33, 35, 37. In this example the elements 31, 33, 35, 37 are formed of the same semi-opaque material as the opacifying core sub-layers 53. The opacifying core sub-layers 53 and elements 31, 33, 35, 37 on each side may be integral with one another, and could be produced for example by printing the semi-opaque material on the sides of the first core sub-layer 51. That is, the opacifying core sub-layer 53 and the encoding layers 7*a* or 7*b* on the same side could be laid down at the same time or in the same process. The thickness of each opacifying core sub-layer 53 is uniform across the portion of the security print medium shown.

Like in the example of FIG. 2(*a*), the pattern elements 31, 33, 35, 37 forming the encoding layers in this example are all of the same thickness h and are arranged such that at each position along the X axis a pattern element is either present on the first side 5*a* or the second side 5*b* of the core, but not both. The combined thickness of the two encoding layers (and the opacifying core sub-layers 53, which have a uniform optical density) is thus constant across the portion of the security print medium 1 shown. The optical density of the security print medium 1 is therefore also constant along the X axis. As a result, the individual elements 31, 33, 35, 37, and hence the encoding feature defined by the predetermined pattern in accordance with which they are arranged, are concealed when the security print medium 1 is viewed in transmitted visible light, since light transmitted through the security print medium along the Y axis passes through the same amount of the semi-opaque material at each point along the X axis. Indeed, the same will be the case for all transmission illumination wavelengths apart from the predetermined input/output radiation. The elements 31, 33, 35, 37 are also concealed when the security print medium 1 is viewed in reflected visible light (and other wavelengths aside from the predetermined input/output radiation), since their appearance matches that of the respective opacifying core sub-layers 53 on which they are carried (as both are formed of the same semi-opaque material).

FIG. 3(*b*) shows the intensity I of output radiation measured on the first side 1*a* of the security print medium 1 while the security print medium 1 is under irradiation with the predetermined input radiation in the same configuration illustrated in FIG. 2(*c*). The semi-opaque material that forms the opacifying core sub-layers 53 and the elements 31, 33, 35, 37 scatters the predetermined input and/or output radiation, and as a result the measured intensity I is reduced where the elements 31, 33 are located on the first side 5*a* of the core 5. As the arrangement of the elements 35, 37 in the second encoding layer 7*b* is effectively the negative of that in the first encoding layer 7*a*, the inverse pattern to that shown in FIG. 3(*b*) would be observed if the output radiation were detected on the second side 1*b* of the security print medium 1. Hence, while the configuration of the elements 31, 33, 35, 37 cannot be seen when the security print medium 1 is viewed in reflected or transmitted visible light (and preferably some non-visible wavelengths), it gives rise to a variation in the output radiation measured on either side of the security print medium, corresponding to the encoding feature, when illuminated with the predetermined input radiation.

Figure 4A:
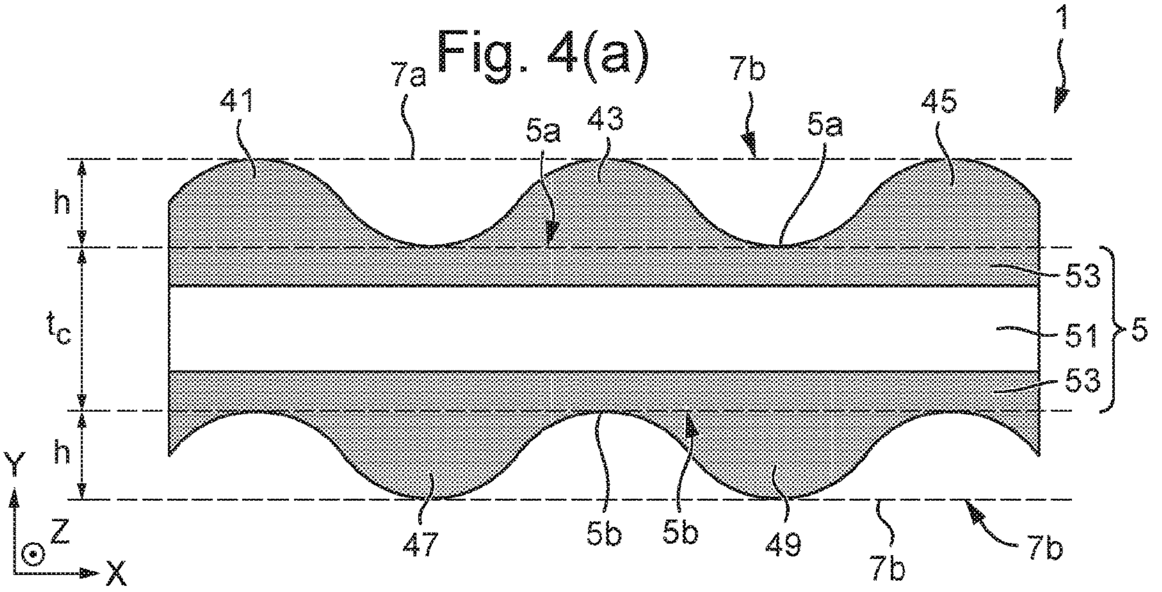
FIG. 4 shows (a) a cross-sectional view of a third embodiment of a security print medium in accordance with the first aspect of the invention, and (b) the intensity profile of radiation output by the security print medium shown in FIG. 4(*a*)
Figure 4B:
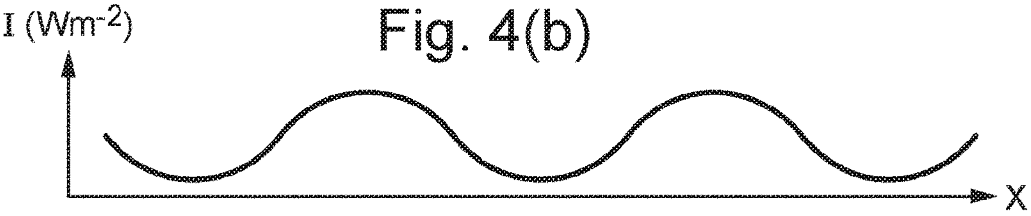

FIG. 4 shows a third example of a security print medium 1 in accordance with the first aspect of the invention. Like in the example of FIG. 3(*a*), the security print medium 1 comprises a core 5 that includes a first core sub-layer 51 and opacifying core sub-layers 53 that defines the first side 5*a* and second side 5*b* of the core 5. It also includes a first encoding layer 7*a* and a second encoding layer 7*b*, which are each configured in accordance with a predetermined pattern and include pattern elements 41, 43, 45, 47, 49.

In the examples shown in FIGS. 2(*a*) and 3(*a*), the elements described were of a uniform thickness and the thickness of each encoding layer 7*a*, 7*b* thus varied discretely between zero and the value h. The optical density of each encoding layer 7*a*, 7*b* in those examples also varied discretely (i.e. step-wise) as a result of this configuration. The example of FIG. 4(*a*) differs from those of FIGS. 2(*a*) and 3(*d*) in that the thickness of each pattern element 41, 43, 45, 47, 49 varies continuously between zero and a maximum h. However, the elements 41, 43, 45, 47, 49 are shaped and positioned within their respective encoding layers 7*a*, 7*b* such that the sum of the thicknesses of the first and second encoding layers 7*a*, 7*b* is constant along the X axis. As a result, the optical density (to at least visible light transmitted through the security print medium 1 along the Y axis) of the security print medium 1 is constant along the X axis. The elements 41, 43, 45, 47, 49 are again also hidden when viewed in reflected visible light because their visual appearance matches that of the opacifying core sub-layers 53 on which they are respectively disposed. The same is preferably the case under some non-visible wavelengths. It should be noted that if the opacifying core sub-layers 53 were omitted from this example, the elements 41, 43, 45, 47, 49 could still be hidden when viewed in reflected visible light provided that the thickness of the encoding material in each encoding layer were non-zero at every location in the first region.

The elements 41, 43, 45, 47, 49 give rise to a spatially continuous variation, in accordance with the predetermined pattern, in the output radiation detected on either side of the security print medium 1 when illuminated with the predetermined input radiation. FIG. 4(*b*) shows the intensity I of output radiation measured on the first side 1*a* of the security print medium 1 in the configuration illustrated in FIG. 2(*c*).

The inverse pattern would be observed if the intensity were measured on the second side 1*b* of the security print medium 1.

Figure 5A:
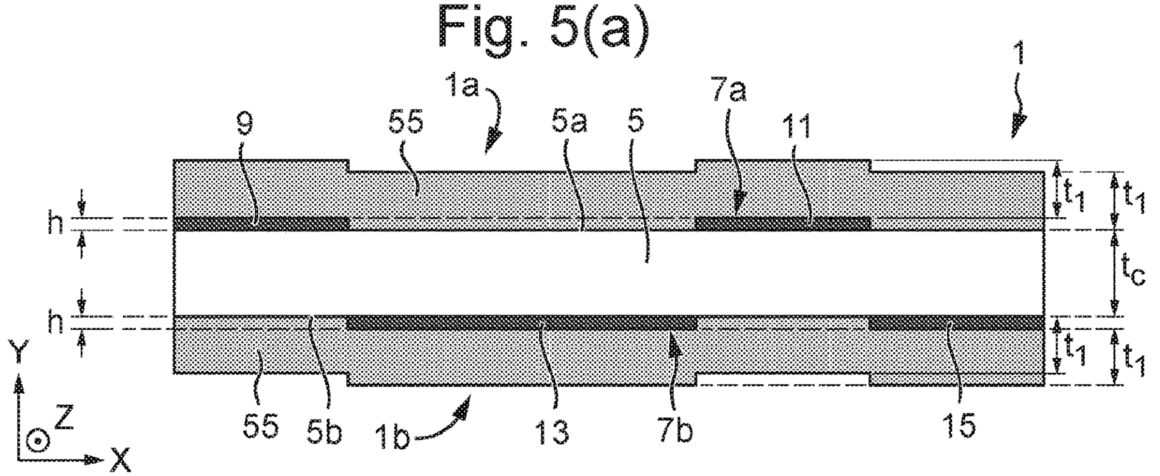
FIG. 5 shows (a) a cross-sectional view of a fourth embodiment of a security print medium in accordance with the first aspect of the invention, and (b) the intensity profile of radiation output by the security print medium shown in FIG. 5(*a*)
Figure 5B:
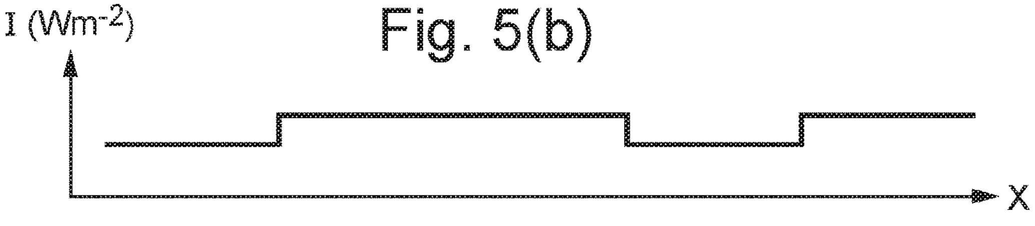

FIG. 5 shows a cross-sectional view of a fourth example of a security print medium 1 in accordance with the first aspect of the invention. The security print medium 1 includes a core 5, which in this example is shown as a single layer but, like the examples discussed above, could include a plurality of sublayers such as those shown in FIGS. 7(*a*) to 7(*f*), which will be described later. Like in the examples above, the core 5 includes a radiation-responsive substance that produces a predetermined output radiation in response to being irradiated with a predetermined input radiation.

A first encoding layer 7*a* comprising pattern elements 9, 11 is disposed on a first side 5*a* of the core 5, and a second encoding layer 7*b* comprising pattern elements 13, 15 is disposed on a second side 7*b* of the core 5. Like in the previous examples, the first and second encoding layers 7*a*, 7*b* (and hence the arrangement of the elements 9, 11, 13, 15 within them) are configured in accordance with a predetermined pattern. The elements 9, 11, 13, 15 in this example are formed of a material that absorbs some or substantially all of the predetermined input and/or output radiation incident on it. The elements in this example 9, 11, 13, 15 each have the same thickness h, and as a result the optical density of each encoding layer 7*a*, 7*b* varies discretely across the area shown. It should be understood, however, that (in this example and others) it is not essential that the thicknesses of the elements 9, 11, 13, 15 are equal to one another provided that the optical transmission of the core 5 and first and second encoding layers 7*a*, 7*b* in combination is constant across the first region $R_1$. For example, if elements formed of a particular encoding material at a finite thickness are completely opaque to visible light, then their respective optical transmission will not be decreased in a manner perceptible by an observer viewing the security print medium 1 in transmitted visible light by making them thicker by the addition of more of the same encoding material.

On each of the first and second encoding layers 7*a*, 7*b* is disposed a respective concealing layer 55. That is, each encoding layer is located between the core 5 and a respective concealing layer 55. The concealing layers 55 are each formed of a semi-opaque material that scatters visible light, such as an opacifying coating. In this example the two concealing layers 55 are formed of the same semi-opaque material and each have the same thicknesses $t_1$, but in other examples the respective concealing layers could be formed of different materials and/or have different dimensions from one another. In this example the concealing layers 55 are formed such that each concealing layer 55 is in direct contact with the core 5 in the spaces between elements 9, 11, 13, 15 in the first or second encoding layer 7*a*, 7*b* on its respective side. This results in the concealing layers being raised with respect to the core 5 on either side at the positions of the elements 9, 11, 13, 15 on the respective side, but this does not mean that the elements 9, 11, 13 15 are detectable by visual inspection of the concealing layers 55. In other examples, encoding layers could be made planar by the inclusion of an optically transparent material of a thickness h between elements 9, 11, 13, 15, and this would result in the concealing layers 55 also being planar across the extent of the security print medium 1 illustrated.

The elements 9, 11, 13, 15, and hence the encoding feature defined by the predetermined pattern in accordance with which they are arranged, are not visible when the security print medium 1 is viewed at least in reflected visible light as a result of being hidden by the concealing layers. The elements 9, 11, 13, 15 are also concealed when the security print medium 1 is viewed at least in transmitted visible light since the sum of the optical densities of the concealing layers 55, the encoding layers 7*a*, 7*b* and the core 5 is constant across the extent of the security print medium 1 shown.

FIG. 5(*b*) shows the intensity I of output radiation measured from the first side 1*a* of the security print medium 1 of FIG. 5(*a*) under irradiation with the predetermined input radiation as illustrated in FIG. 2(*c*). Like in FIG. 2(*d*), the measured intensity I is greater at the positions along the X axis at which the elements 9, 11 in the first encoding layer 7*a* are not present.

Figure 6A:
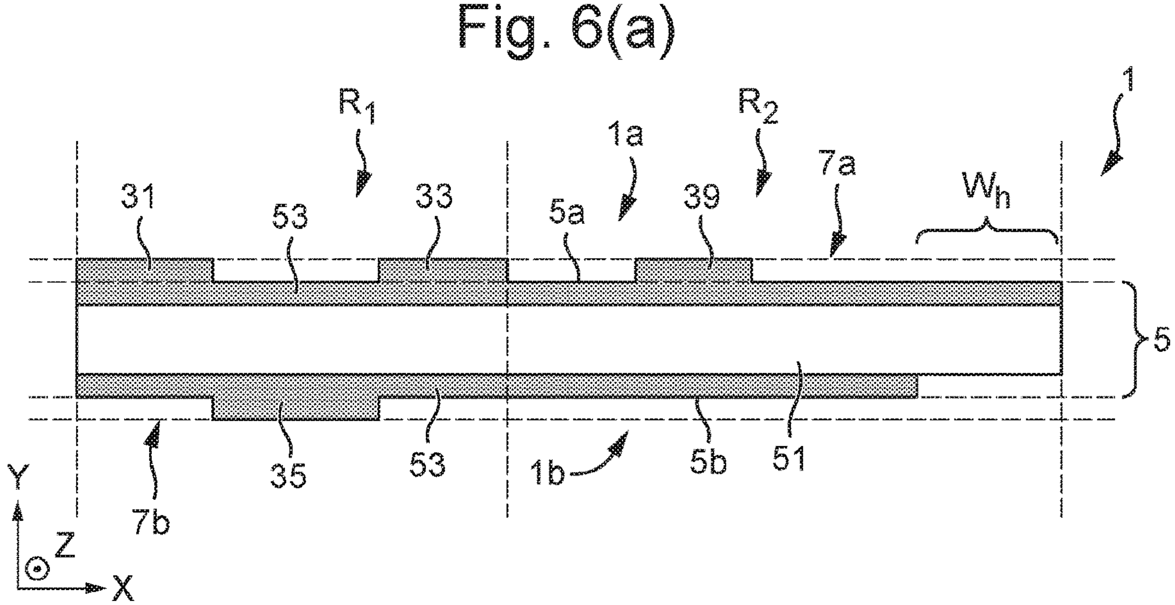
FIG. 6 shows (a) a cross-sectional view of a fifth embodiment of a security print medium in accordance with the first aspect of the invention, (b) a plan view of the security print medium shown in FIG. 6(*a*), and (*c*) the intensity profile of radiation output by the security print medium shown in FIGS. 6(*a*) and 6(*b*)
Figure 6B:
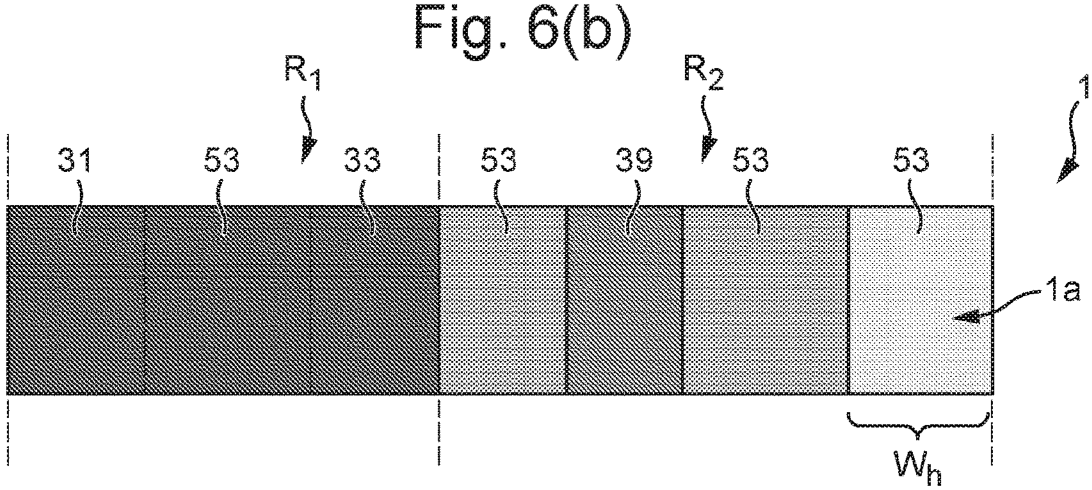
Figure 6C:
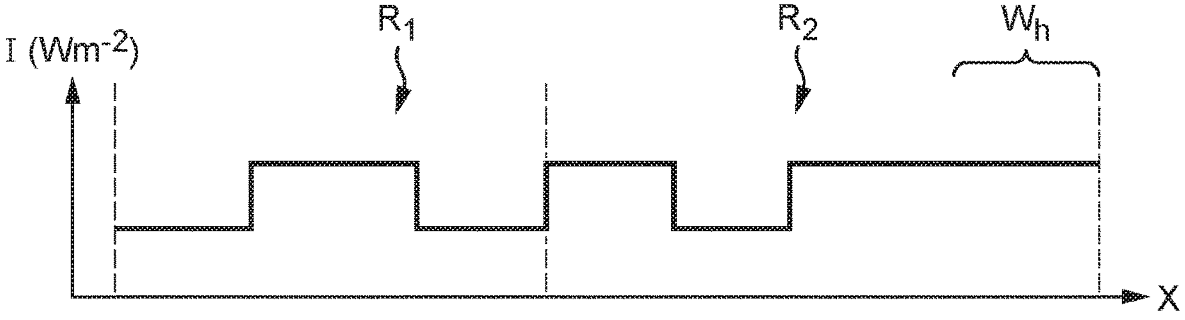
Figure 7A:
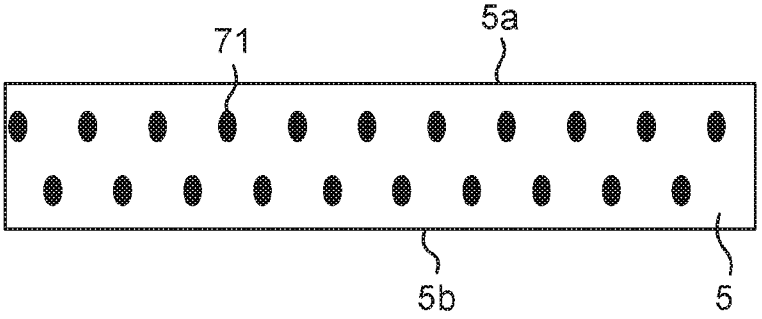
FIGS. 7(*a*) to 7(*f*) show examples of cores suitable for incorporating in security print media in accordance with the first aspect of the invention.
Figure 7B:
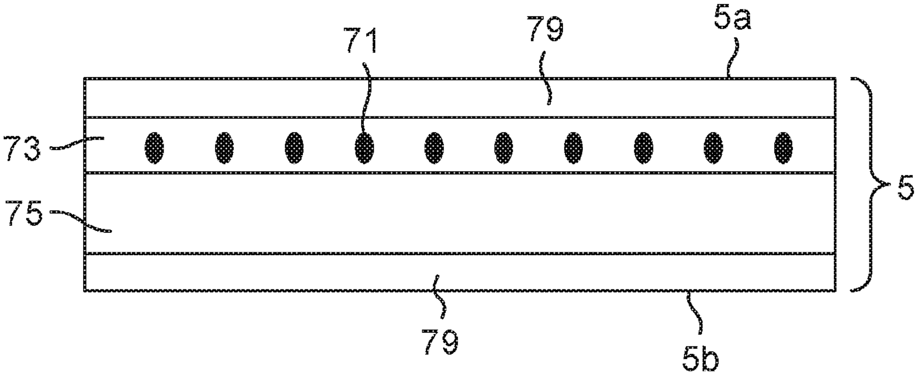
Figure 7C:
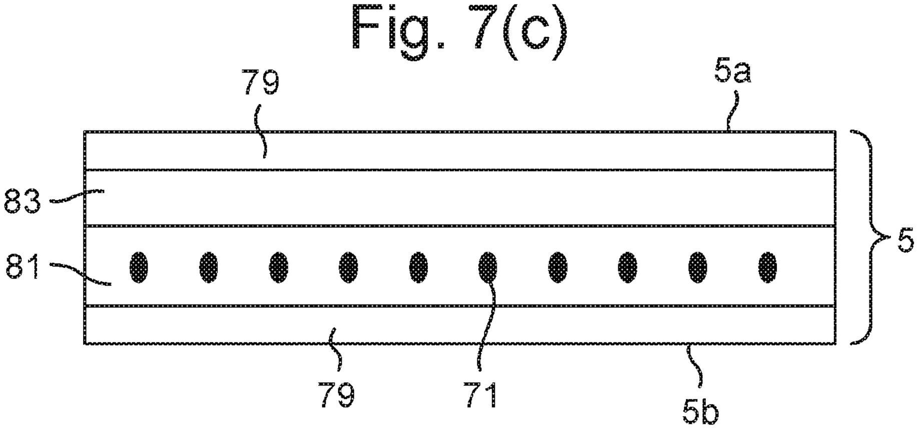
Figure 7D:
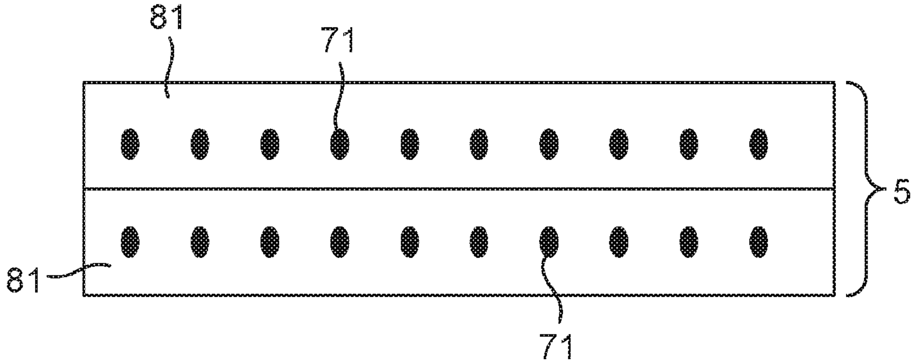
Figure 7E:
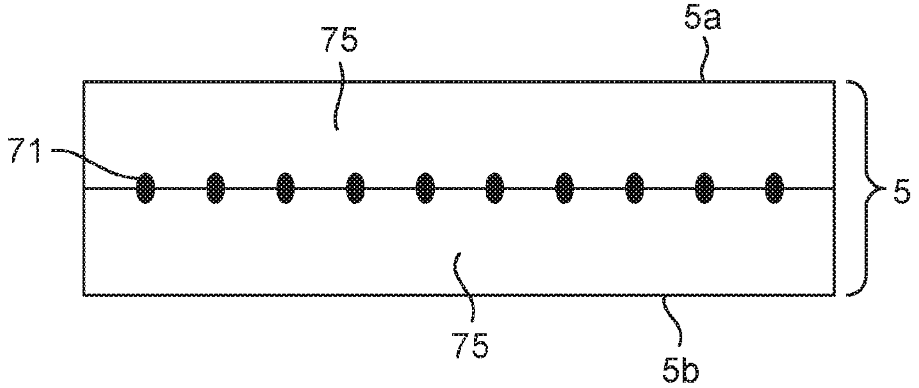
Figure 7F:
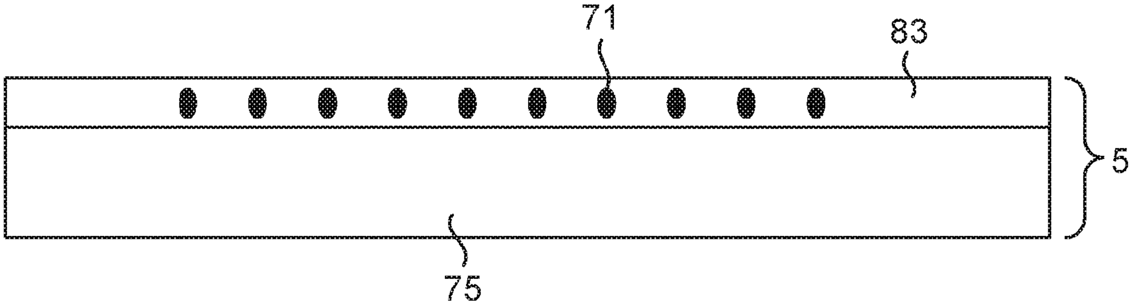
Figures 8A, 8B, 8C, 8D:
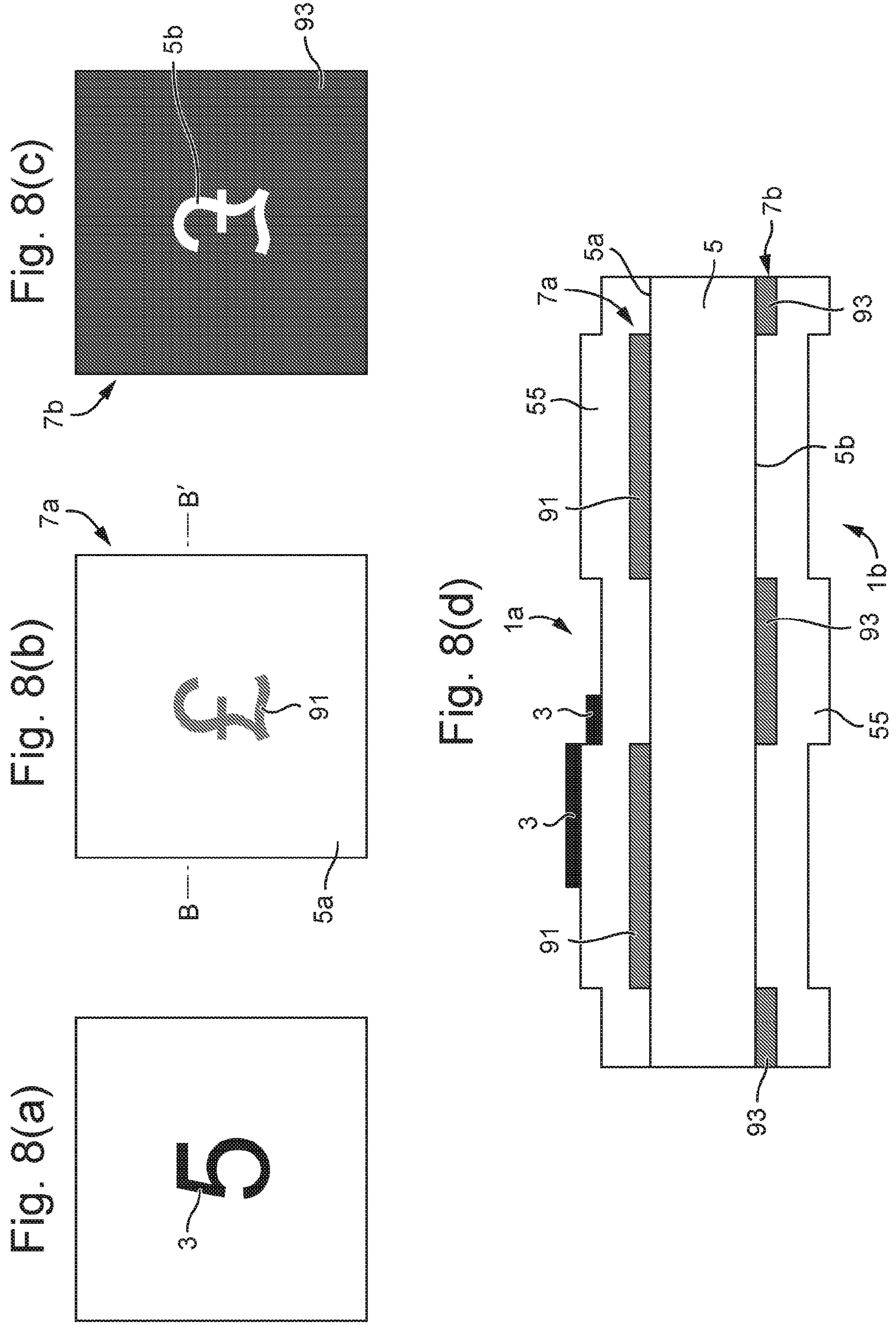
FIG. 8 shows (a) a first example of a print feature suitable for incorporating in security print media in accordance with the first aspect of the invention, (b) and (c) an example of an encoding feature that may be combined with the print feature of FIG. 8(*a*), (*d*) a cross-sectional view of an exemplary security print medium in accordance with the first aspect of the invention provided with the print feature and the encoding feature of FIGS. 8(*a*) to 8(*c*), and (*e*), (*f*) and (*g*) the exemplary security print medium of FIG. 8(*d*) viewed under different lighting conditions.
Figure 8G:
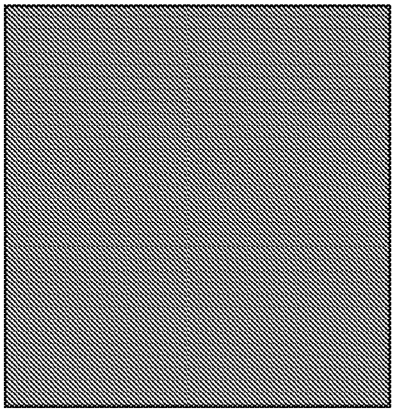
Figure 8F:
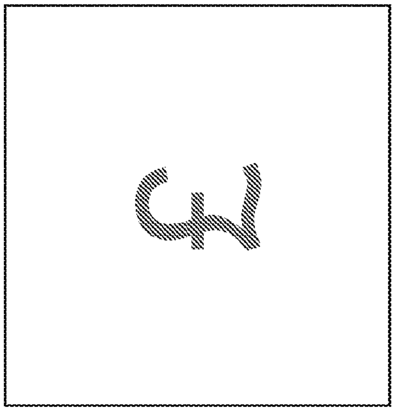
Figure 8E:
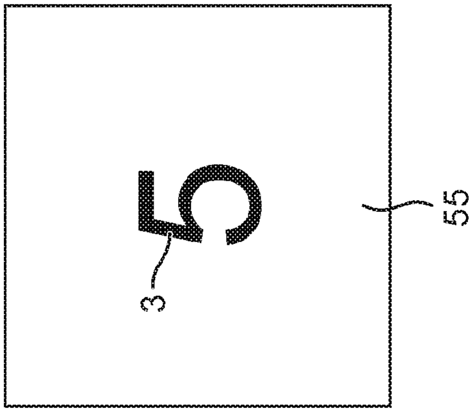
Figures 9A, 9B, 9C, 9D, 9E:
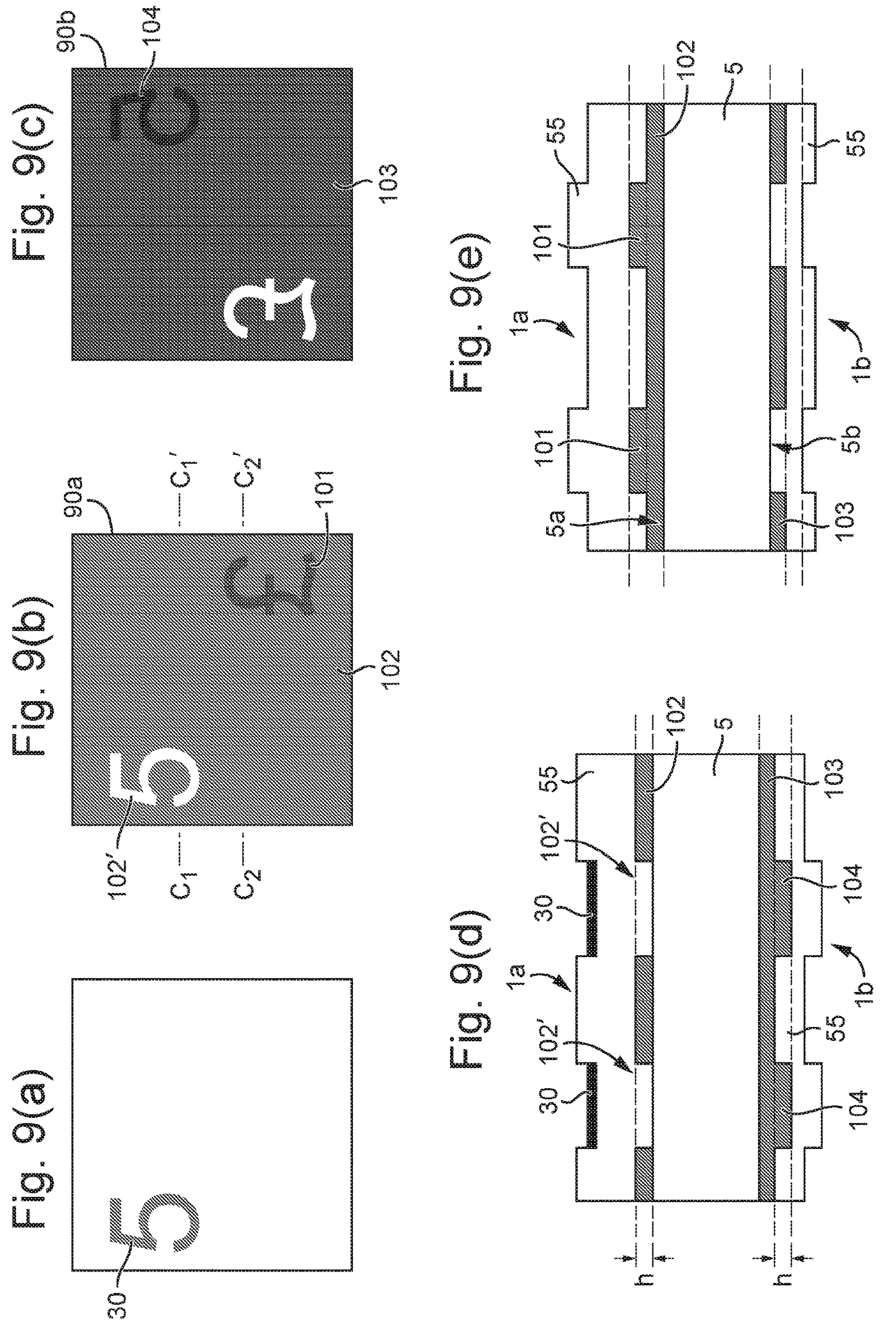
FIG. 9 shows (a) a second example of a print feature suitable for incorporation in security print media in accordance with the first aspect of the invention, (b) and (c) an example of an encoding feature that may be combined with the print feature of FIGS. 9(*a*), (*d*) and (*e*) cross-sectional views of an exemplary security print medium in accordance with the first aspect of the invention provided with the print feature and the encoding feature of FIGS. 9(*a*) to 9(*c*), and (*f*), (*g*) and (*h*) the exemplary security print medium of FIGS. 9(*d*) and 9(*e*) viewed under different lighting conditions.
Figure 9H:
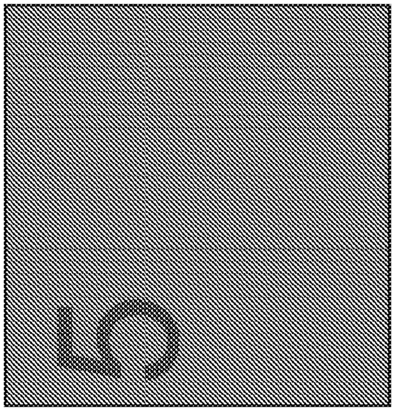
Figure 9G:
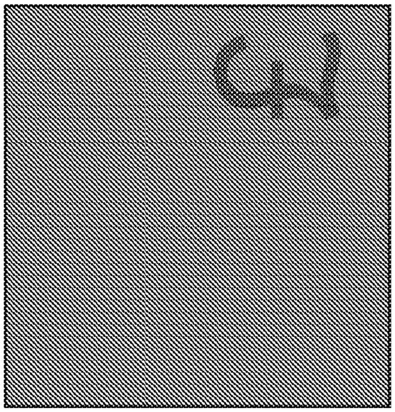
Figure 9F:
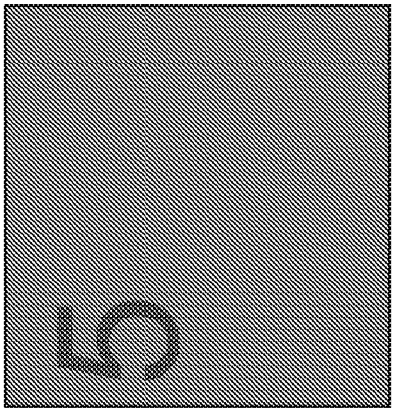
Figures 10A, 10B, 10C, 10D:
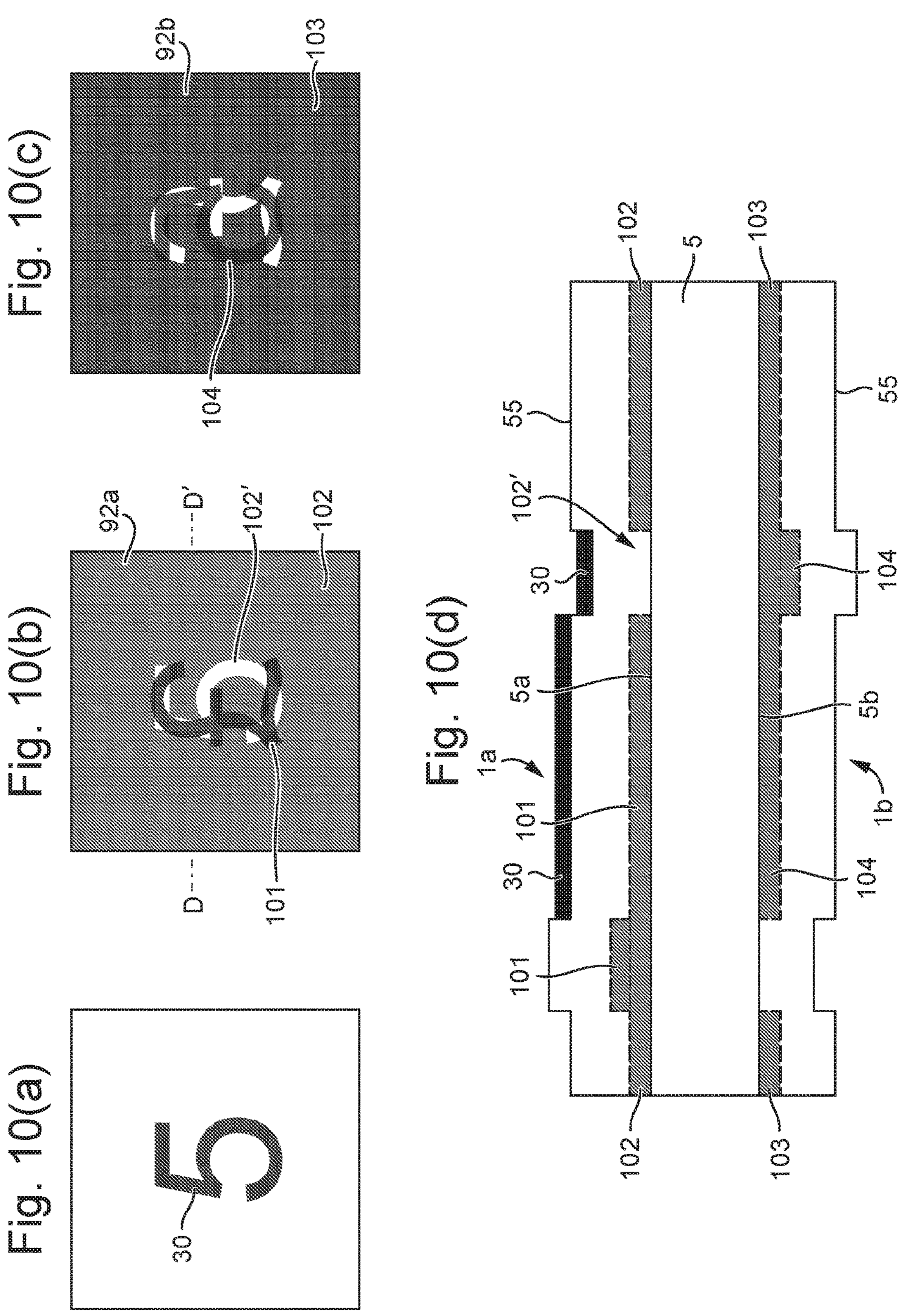
FIG. 10 shows (a) a third example of a print feature suitable for incorporation in security print media in accordance with the first aspect of the invention, (b) and (c) an example of an encoding feature that may be combined with the print feature of FIG. 10(*a*), (*d*) a cross-sectional view of an exemplary security print medium in accordance with the first aspect of the invention provided with the print feature and the encoding feature of FIGS. 9(*a*) to 9(*c*), and (*e*), (*f*) and (*g*) the exemplary security print medium of FIG. 9(*d*) viewed under different lighting conditions.
Figure 10E:
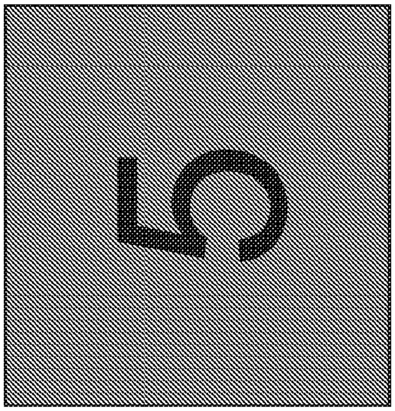
Figure 10F:
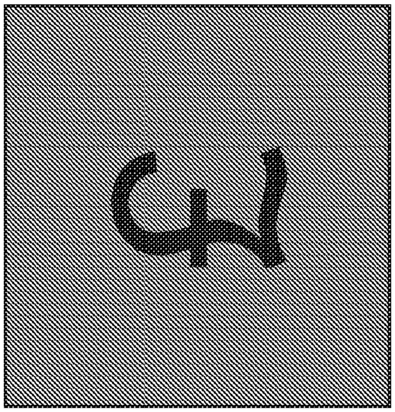
Figure 10G:
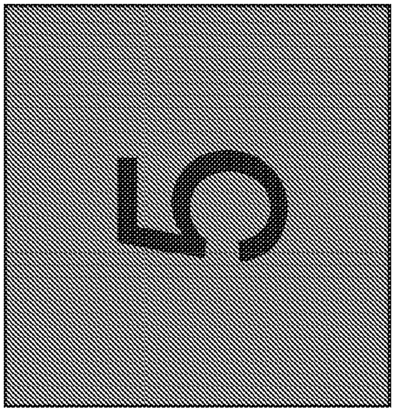
Figure 11A:
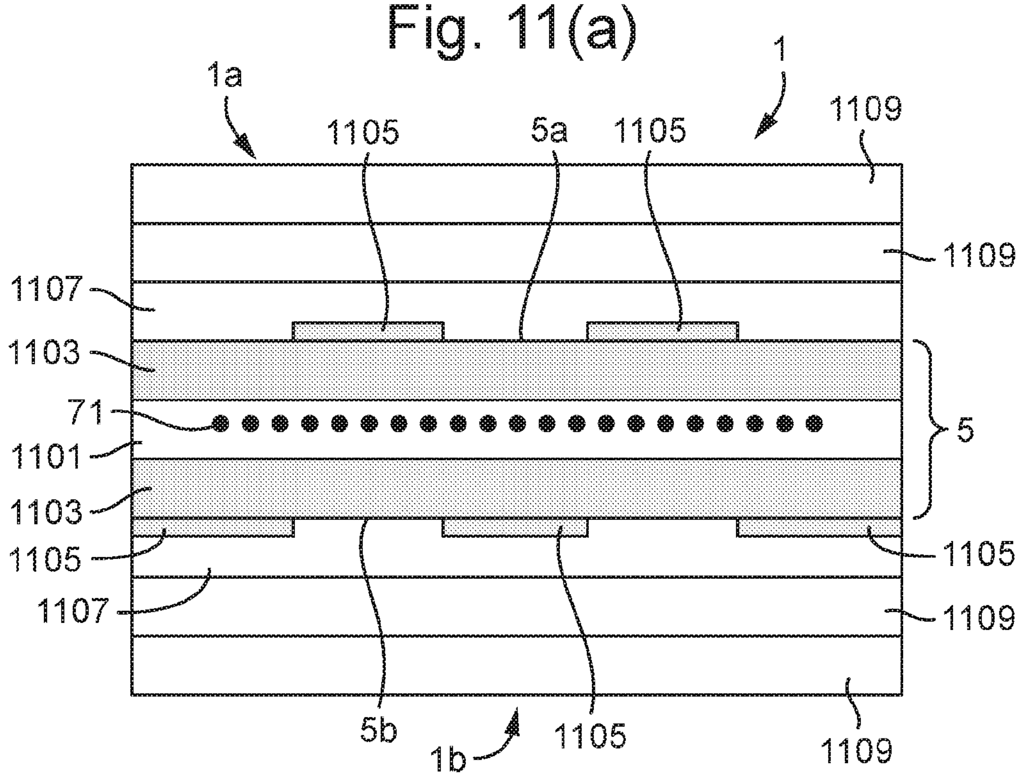
FIGS. 11(*a*) to 11(*f*) show cross-sectional views of examples of security print media in accordance with the first aspect of the invention.
Figure 11B:
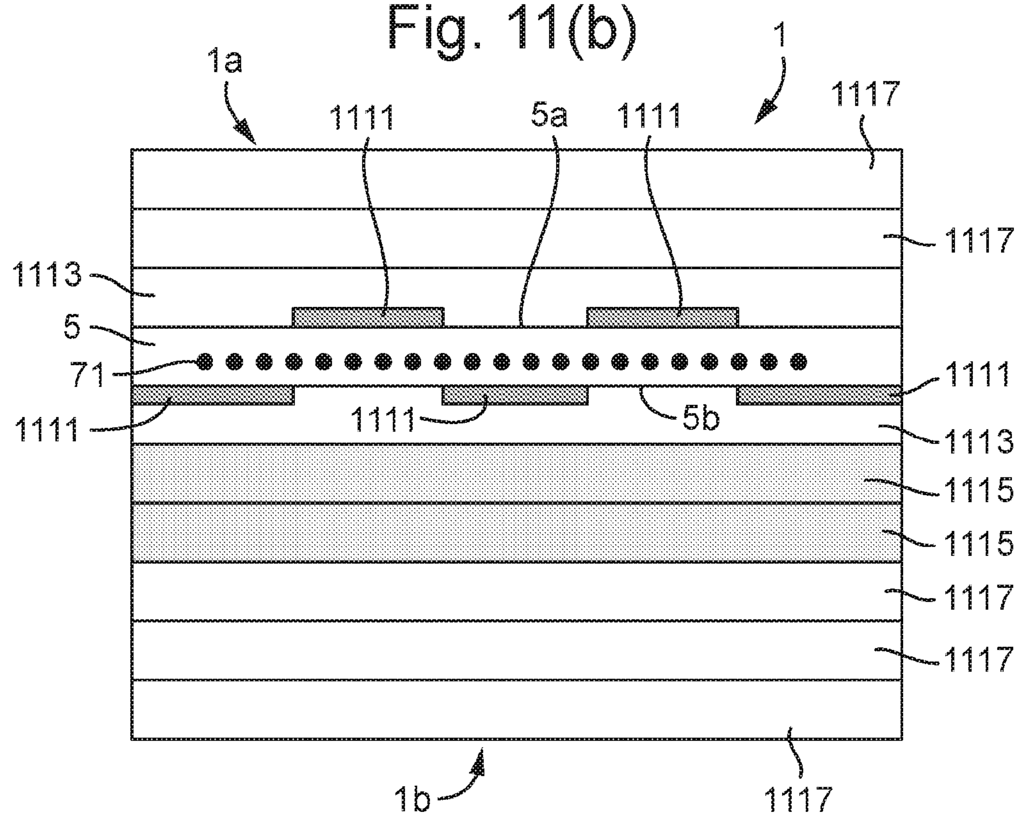
Figure 11C:
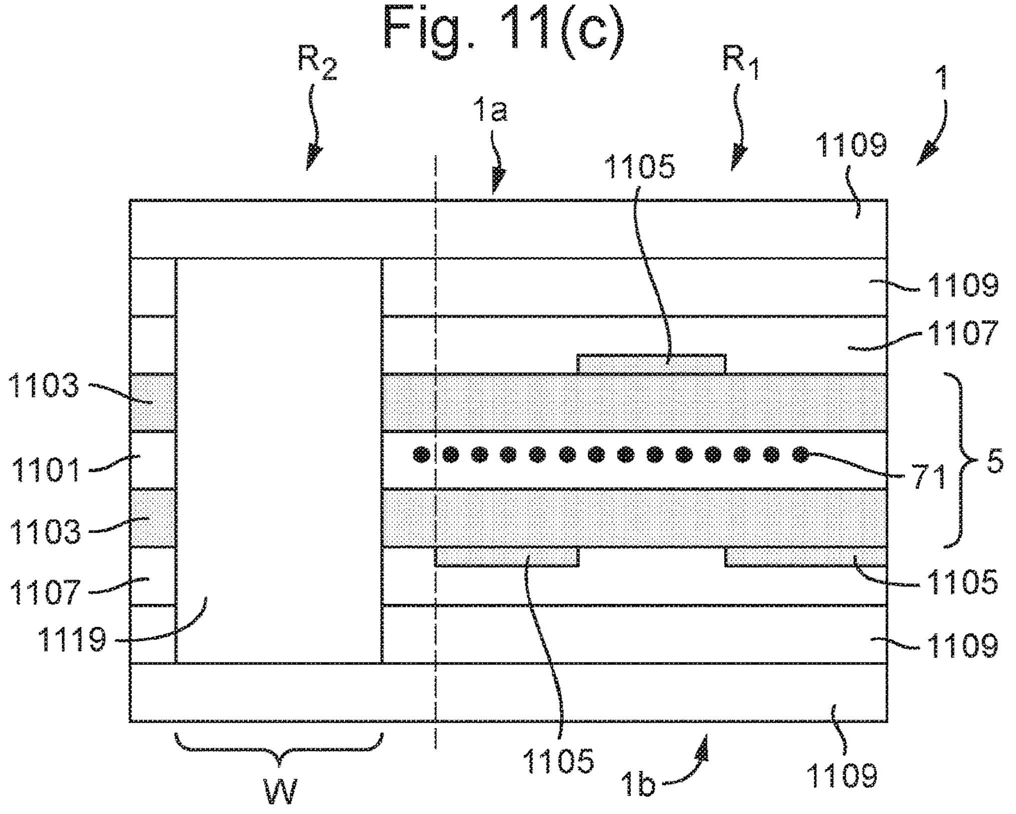
Figure 11D:
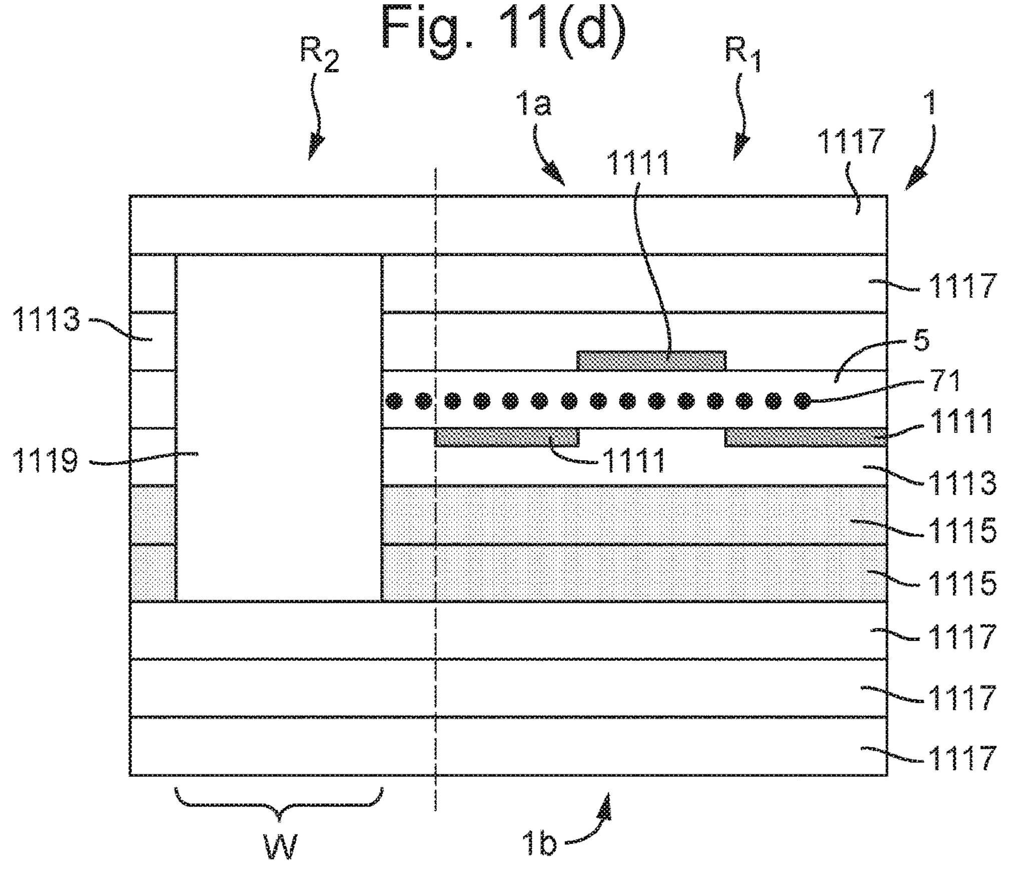
Figure 11E:
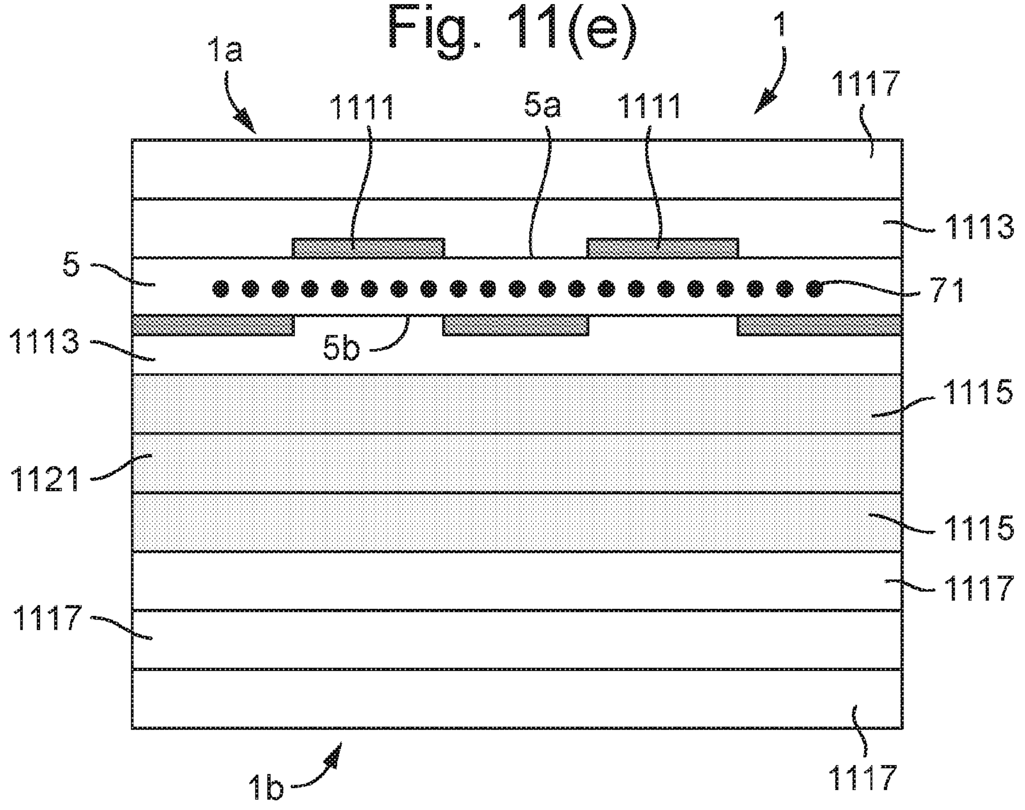
Figure 11F:
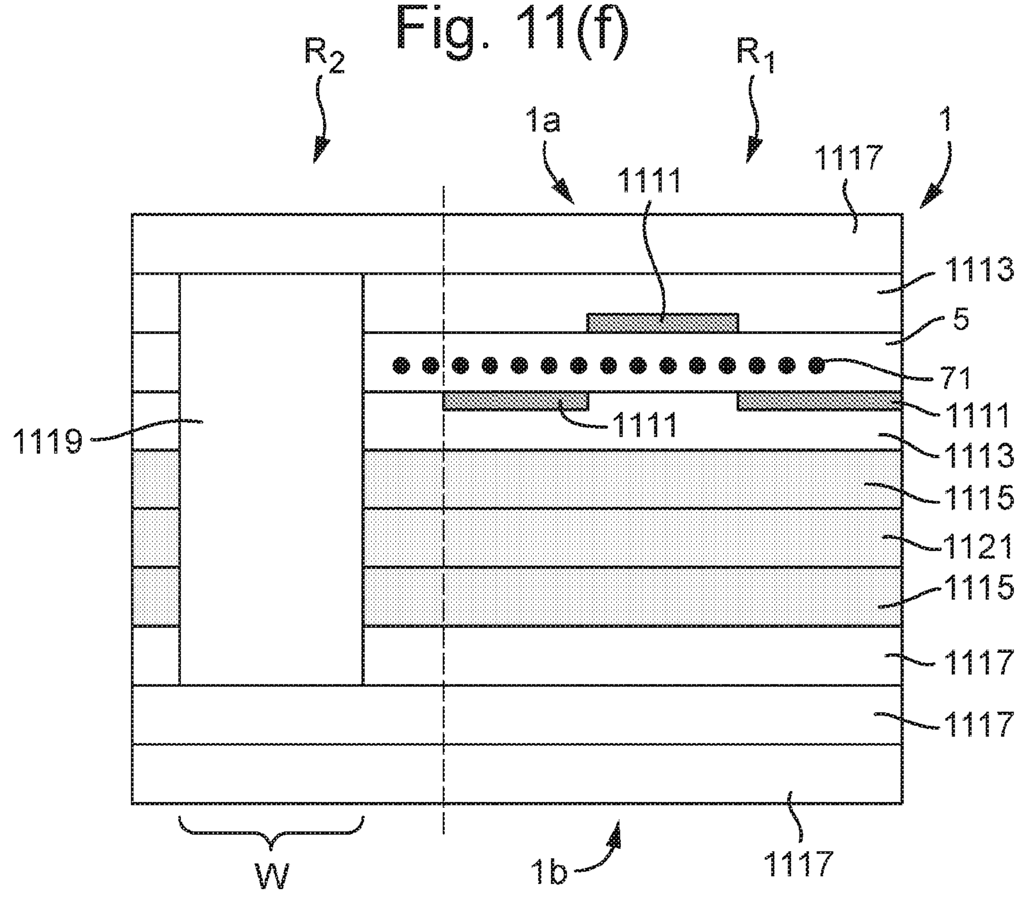

FIG. 6(*a*) shows a cross-sectional view of a fifth example of a security print medium 1 in accordance with the first aspect of the invention. A first region $R_1$ and a second region $R_2$ are shown. These regions could, for example, correspond to the first and second regions shown in FIG. 1.

Similar to the example of FIG. 3(*a*), the security print medium 1 comprises a core 5 that includes a first core-sublayer 51, which in this example is optically transparent, and opacifying core sub-layers 53, which are each formed of a semi-opaque material. The security print medium 1 also includes a first encoding layer 7*a* comprising pattern elements 31, 33, 39 disposed on the first side 5*a* of the core and a second encoding layer 7*b* that includes a pattern element 35 disposed on the second side 5*b* of the core. Like in the examples above, the first and second encoding layers 7*a*, 7*b* are configured in accordance with a predetermined pattern and together provide and encoding feature in the security print medium 1. The elements 31, 33, 35, 39 are formed of the same semi-opaque material as the opacifying core sub-layers 53.

In the first region $R_1$, the elements 31, 33, 35 are configured in accordance with the predetermined pattern such that the sum of the thicknesses of the first and second encoding layers 7*a*, 7*b* (and hence the sum of their optical densities) is constant across the first region $R_1$. As a result, the elements 31, 33, 35 in the first region $R_1$ are concealed when the security print medium 1 is viewed at least in transmitted visible light. In the second region $R_2$, however, the second encoding layer 7*b* does not include any elements, and thus does not constitute a negative of the first encoding layer 7*a*. Furthermore, a part of the opacifying sub-layer 53 on the second side 5*b* of the core has been omitted so as to define a half-window $W_h$. In a variant, the opacifying sub-layers 53 could be omitted on both sides of the core 5 in this region, resulting in a transparent window.

FIG. 6(*b*) shows the appearance of the security print medium 1 of FIG. 6(*a*) when viewed from the first side 1*a* in transmitted visible light. Since the optical density of the security print medium is constant across the first region $R_1$, there is no variation in the intensity of transmitted light between the positions of the elements 31, 33, 35 in this region. Moreover, the elements 31, 33, 35 in the first region $R_1$ are concealed in reflected visible light as a result of appearance of the encoding features being matched to that of the opacifying core sub-layers 53 which define the first side 5*a* and second side 5*b* of the core 5. While the element 39 in the second region $R_2$ is also concealed in reflected visible light for the same reason, it is visible when the security print medium 1 is viewed in transmitted visible light since the optical density of the security print medium 1 on either side of it simply corresponds to that of the two opacifying core sub-layers 53, rather than that of the two opacifying core sub-layers 53 in combination with an encoding feature. The predetermined pattern may thus be identifiable in the second region $R_2$ when the security print medium 1 is viewed in reflected visible light. The optical density of the core is further reduced at the location of the half-window $W_h$ as a result of the removal of part of the opacifying core sub-layer 53 on the second side 5*b* of the core 5.

In the second region $R_2$ there is thus a visually observable variation in the intensity of visible light transmitted through the security print medium 1. This configuration thus defines an additional security feature in the form of a pseudo-watermark (preferably a multi-tonal pseudo-watermark) in the second region $R_2$.

FIG. 6(*c*) shows the intensity I of output radiation measured from the first side 1*a* of the security print medium 1 of FIG. 6(*a*) under irradiation with the predetermined input radiation as illustrated in FIG. 2(*c*). The elements 31, 33, 39 cause the intensity of the output radiation to vary across both the first region $R_1$ and the second region $R_2$.

FIGS. 7(*a*) to 7(*f*) show exemplary configurations of the core 5 suitable for incorporation in security print media according to the first aspect of the invention, and which could be used to implement and of the embodiments described herein. In each example the core 5 includes a radiation-responsive substance that responds to a predetermined input radiation by producing a predetermined output radiation. The predetermined input radiation and predetermined output radiation may each include one or several respective wavelengths. For example, the predetermined input radiation could include one or more ultraviolet wavelengths and the predetermined output radiation could include one or more wavelengths in the infrared. It should be understood that the radiation-responsive substances shown in these examples could include one or several such substances each responsive to a different one or more input wavelengths and capable of producing a different one or more output wavelengths. In the examples of FIGS. 7(*b*) to 7(*f*) the core 5 includes multiple core sub-layers, and in each example these could be produced together (for example by co-extrusion in the molten state) or produced separately and then laminated together.

In the example of FIG. 7(*a*), the core 5 includes a single layer of material in which the radiation-responsive substance 71 is distributed. A security print medium in accordance with the first aspect of the invention incorporating the core 5 of this example could thus include encoding layers disposed directly on the first side 5*a* and the second side 5*b* of the core 5. This core 5 could, for example, be used to produce a security print medium as shown in FIG. 2(*a*).

In the example of FIG. 7(*b*), the core includes a self-supporting sub-layer 75 (which could be included to provide rigidity and/or strength to the security print medium, for example) and the radiation-responsive material is contained in a separate core sub-layer 73 disposed directly on the self-supporting sub-layer.

Two sub-layers 79 are disposed on the outer sides of the self-supporting polymer sub-layer and the sub-layer 73 containing the radiation-responsive substance 71. The sub-layers 79 could each be optically transparent (for example being formed by an optically transparent polymer) or semi-opaque. One or both sub-layers 79 could, for example, be an opacifying sub-layer as described above with reference to FIGS. 3(*a*), 4(*a*) and 6(*a*). If the core 5 is to be incorporated in a security print medium in which the encoding features are printed, it is advantageous if the sub-layers 79 are formed of a print-receptive material, and particularly advantageous if these sub-layers 79 of print-receptive material are coextruded with the core 5. Alternatively, the sub-layers 79 could be coated onto the core 5.

In the example of FIG. 7(*c*), the radiation-responsive substance is contained within a self-supporting sub-layer 81. An additional sub-layer 83 is disposed on the self-supporting sub-layer 81. The sub-layer 83 could be included to increase the thickness of the core 5 to a desired value, for example. Similarly to the example of FIG. 7(*b*), coating sub-layers 79 are disposed at the outermost parts of the core 5 and define its first side 5*a* and second side 5*b*. The sub-layer 83 and the coating sub-layers 79 could each be optically transparent or semi-opaque.

In the example of FIG. 7(*d*) the core 5 includes two sub-layers 81, each of which includes a radiation-responsive substance 71. The radiation-responsive substance in each sub-layer could be the same as that in the other, or could be different (such that the radiation-responsive substance 71 in each layer responds to a different one or more input wavelengths and/or outputs a different one or more output wavelengths). It should be noted that it is not generally essential that the radiation-responsive substance is contained in an optically transparent layer, so in this example one or both sub-layers 81 could be formed of a material that scatters and/or absorbs a fraction of one or both of the predetermined input radiation incident on it or the predetermined output radiation output by the radiation-responsive substance as it travels out of the core 5.

In the example of FIG. 7(*e*), the core includes two sub-layers 75, neither of which contains the radiation-responsive substance 71. Instead, the radiation-responsive substance 71 is disposed between the two sub-layers 75. This configuration could be achieved by, for example, coating, or printing on, one side of one of sub-layer 75 with the radiation-responsive material 71 and then laminating or casting the other sub-layer 75 on that side. Alternatively the radiation responsive substance 71 could be dispersed in an adhesive used to join the sub-layers 75 to one another.

In the example of FIG. 7(*f*), the radiation-responsive material is contained within a coating layer 83 that is disposed on a sub-layer 75. The coating layer 83 could be applied to the sub-layer 75 after the sub-layer 75 has been manufactured, or could be coextruded with the sub-layer 75 from the molten state.

In all of the examples described above with reference to FIGS. 7(*a*) to 7(*f*), the radiation-responsive substance is preferably distributed uniformly throughout one or each of the sub-layers in which it is incorporated, particularly preferably across the whole security print medium. The sub-layers shown in these examples may be produced and combined by a variety of processes. Sub-layers may be extruded from the molten state, for example, and groups of two or more adjacent sub-layers can be coextruded together. A Stenter process may be used to produce extruded or coextruded sublayers, for example, and may include one or more steps of biaxially orienting the extruded films (either sequentially or simultaneously). Bubble or blown film processes may also be used to produce sub-layers of the core. Where the sub-layers are extruded, the radiation-responsive substance may be mixed with the molten material from which the sub-layers are to be formed prior to the extrusion, preferably in a masterbatching process. Alternatively, the radiation-responsive substance could be applied to the sub-layers after their production (as may be performed in the manufacture of a core such as that shown in FIG. 7(*e*)). Sub-layers may be produced separately to one another and later laminated (e.g. by the application of heat and pressure) or otherwise affixed to one another (e.g. using an adhesive). Preferably the material(s) from which the or each core layer (or sub-layer) is made is a polymeric material, such as polypropylene, biaxially orientated polypropylene or the like. Further examples will be given below.

In each of the examples shown FIGS. 7(*a*) to 7(*f*), above (and indeed in all the security print media described herein), the radiation responsive substance may be configured such that the predetermined input radiation and/or the predetermined output radiation is defined by a specific, narrow waveband, for example a waveband having a width of no more than 300 nm, preferably no more than 100 nm, more preferably no more than 50 nm, most preferably no more than 10 nm. This is desirable in order to better hide the presence of the feature from would-be counterfeiters, and make it more difficult to replicate with commercially available materials. In these examples the predetermined input radiation could be provided by a suitable narrow-band source (e.g. an LED or laser), or by a broadband source (e.g. a lamp) capable of producing radiation within the narrow band of the input radiation. Furthermore, each of the predetermined input radiation and/or predetermined output radiation wavebands preferably lie outside the visible portion of the spectrum. Most advantageously, if the input and/or output wavebands occupy only narrow portions of the non-visible spectrum, this means that the presence of the feature will be hidden when the security print medium is viewed not only under visible lighting conditions but also the vast majority of non-visible lighting conditions (both in reflection and transmission). Furthermore, it is preferable that the weight concentration of the radiation-responsive substance in the core is less than 1000 ppm, preferably less than 600 ppm and more preferably less than 400 ppm The complexity, and hence security level, of the presently disclosed security features can be yet further enhanced by the inclusion of a print feature on the outside of the security print media, which may or may not interact with the encoding layers. Three embodiments each making use of such a print feature will be described with reference to FIGS. 8, 9 and 10.

FIG. 8(*a*) shows a first example of a print feature 3 that may be incorporated in a security print medium 1 in accordance with a first aspect of the invention. The print feature 3 could, for example, be applied in the first region $R_1$ of the security print medium 1 shown in FIG. 1. Where incorporated in a security print medium, the print feature 3 would be positioned outboard of the encoding layer and any concealing layer(s) on the respective side of the core on which it is disposed. In this case, the print feature 3 has the form of the digit "5", but of course any image, symbol, alphanumeric code or other graphic could be used instead.

FIG. 8(*b*) shows a first encoding layer 7*a*, configured in accordance with a predetermined pattern defining an encoding feature which here takes the form of the symbol "£", conveyed by pattern element 91. The first encoding layer is disposed on a first side 5*a* of a core 5 (best shown in FIG. 8(*d*)) of a security print medium 1. The first encoding layer 7*a* is shown in this Figure as it would be oriented when the first side 5*a* of the core 5 is facing towards the viewer.

Darker portions of the Figure denote higher optical density portions of the layer 7*a*, and vice versa.

FIG. 8(*c*) shows a second encoding layer 7*b*, again configured in accordance with the same predetermined pattern defining the encoding feature ("£"), However, here the pattern is inverted such that it takes the form of a pattern element 93 surrounding a gap in the form of the symbol "£". The second encoding layer is disposed on the second side 5*b* of the core 5 (again best shown in FIG. 8(*d*)) of the security print medium 1. The second encoding feature 93 is shown in this Figure as it would be oriented when the second side 5*b* of the core is facing towards the viewer. Darker portions of the Figure denote higher optical density portions of the layer 7*b*, and vice versa.

The elements 91, 93 are disposed on the first and second sides 5*a*, 5*b* of the core 5 respectively in registration with one another such that the sum of their thicknesses (and hence the sum of their optical densities) is constant across the region of the security print medium in which they are included.

In this embodiment, the first and second encoding layers 7*a*, 7*b* are each formed of a material which attenuates both the predetermined input radiation and the predetermined output radiation substantially equally.

FIG. 8(*d*) shows a cross-sectional view of a security print medium 1 on which the print feature 3 is provided. This cross-sectional view is taken along the line B-B' shown in FIG. 8(*b*). The security print medium 1 includes a core 5 (which, like the other examples above, contains a radiation-responsive material that produces a predetermined output radiation in response to being irradiated with a predetermined input radiation). The pattern element 91 is disposed directly on the first side 5*a* of the core 5 and the pattern element 93 is disposed directly on the second side 5*b*. Concealing layers 55 are disposed on either side of the core 5 so as to cover the elements 91, 93. The thickness of each concealing layer 55 is constant across the region shown (although each layer may be of a different thickness to the other).

The print feature 3 is disposed on the exterior side of the concealing layer 55 on the first side of the core 5*a*, and is thus visible when the security print medium 1 is viewed from its first side 1*a* in visible light.

In this example the print feature 3 does not absorb or scatter the predetermined input radiation or the predetermined output radiation, and hence does not affect the intensity of the output radiation. The intensity of output radiation produced by the radiation-responsive substance measured on either side of the core 5 will therefore vary only in accordance with the configuration of the encoding layer on the respective side of the core (as described above with reference to, for example, FIGS. 5(*a*) and 5(*b*)).

FIG. 8(*e*) shows the appearance of the security print medium 1 of FIG. 8(*d*) when viewed from the first side 1*a* in either reflected or transmitted visible light. The print feature 3 is visible against the concealing layer 55 that is disposed on the first side 5*a* of the core 5, and the pattern elements 91, 93 are concealed by the concealing layer 55 (when viewed in reflection) or as a result of their combined optical densities being constant across the region shown (when viewed in transmission).

FIG. 8(*f*) shows the appearance of the security print medium 1 of FIG. 8(*d*) when viewed from the first side 1*a*, while illuminated with the predetermined input radiation from the first side 1*a*, in one or more wavelengths that correspond to the predetermined output radiation. Since the print feature 3 does not interact with the predetermined input or output radiation, it is not visible in these wavelengths. The first pattern elements 91 modify the intensity of the predetermined output radiation observed on the first side of the security print medium 1*a*, so the encoding feature (here a "£" symbol) is visible when viewed in these wavelengths.

FIG. 8(*g*) shows the appearance of the security print medium 1 of FIG. 8(*d*) when viewed from its first side 1*a* in the predetermined output radiation while illuminated with the predetermined input radiation from the second side 1*b*. The elements 93 on the second side 1*b* modify the intensity of the input radiation reaching the core such that the intensity of the produced output radiation would vary across the core in accordance with the arrangement of these elements 93.

However, the elements 91 on the first side modify the intensity of the output radiation travelling through the first encoding layer 7*a* in such a manner as to negate the variation in the strength of the output radiation produced across the core, since they are arranged as the negative of the second encoding layer 7*b*. As the print feature 3 does not interact with either the predetermined input or the predetermined output radiation, it is not visible when viewed under the these conditions.

FIG. 9(*a*) shows an example of a print feature 30 that attenuates both the predetermined input radiation and the predetermined output radiation (in variants, such a print feature more generally could interact with one or both of the predetermined input radiation and the predetermined input radiation so as to modify its respective intensity). In this example, the print feature 30 again denotes the digit "5". As will be explained below, the presence of such a print feature in combination with appropriately configured encoding features can cause the appearance of the security print medium to vary under different lighting conditions. In this case it is desirable that the print feature 3 is applied in register with the first and second encoding layers 7*a*, 7*b* as described below.

FIG. 9(*b*) shows a first encoding layer 90*a* of an exemplary security print medium in accordance with the first aspect of the invention on which the print feature 30 is formed. In this embodiment, the predetermined pattern according to which the first encoding layer 90*a* is laid down defines both an encoding feature (here a "£" symbol) represented by pattern elements 101, 103 and a compensating feature represented by pattern elements 102, 102' and 104, configured to interact with the print feature 30 as explained below. As before, the darkness of the Figure denotes the optical density and hence this is greatest in the element 101, and lowest in the element 102'. It will be seen that the element 102' aligns with, and has the same shape as the print feature 30, and is surrounded by a background element 102. The optical density of the elements 102, 102' are selected such that, in combination with the print feature 30, they present a uniform optical density across the first region. It should be noted that whilst in this case the encoding layer 90*a* is formed of a single encoding material of varying thickness (and corresponding optical density), in other cases, the element 101 could be formed of a first encoding material and the elements 102, 102' of a second encoding material (which could be the same as the material forming print feature 30).

FIG. 9(*c*) shows a second encoding layer 90*b* of a security print medium that incorporates the print feature 30 of FIG. 9(*a*) and the first encoding layer 90*a* of FIG. 9(*b*) (oriented such that the second side 5*b* of the security print medium faces towards the viewer, like in FIG. 8(*c*)). The second encoding layer 90*b* is arranged in accordance with the same predetermined pattern as the first encoding layer, but a negative version thereof (in this case, with an added offset uniformly provided across the region). Thus, the encoding feature ("£") here is defined as a gap within background pattern element 103, and the compensating feature ("5") as a relatively high optical density element 104.

As in the previous embodiment, the two encoding layers 90*a*, 90*b* each attenuate both the predetermined input radiation and the predetermined output radiation substantially equally in this example.

FIG. 9(*d*) shows a first cross-sectional view of a security print medium 1 incorporating the print feature 30 and first and second encoding layers 90*a*, 90*b* of FIGS. 9(*a*) to 9(*c*). This cross-sectional view is taken along the line $C_1$-$C_1$' shown in FIG. 9(*b*). The first encoding layer 90*a*, showing the compensating feature conveyed by elements 102, 102', is disposed on a first side 5*a* of a core 5. The second encoding layer 90*b* is disposed on the second side 5*b* of the core 5. Either side of the core 5 is covered by a respective concealing layer 55, and the print feature 30 is disposed on concealing layer 55 that covers the first side 5*a* of the core, in alignment with the encoding layers.

FIG. 9(*e*) shows a second cross-sectional view of the security print medium 1 of FIGS. 9(*a*) to 9(*d*). This cross-sectional view is taken along the line $C_2$-$C_2$' shown in FIG. 9(*b*). Again the compensating feature in the form of element 102 can be seen in the encoding layer 90*a* on the first side 5*a* of the core and in the form of element 103 in the encoding layer 90*b* on the second side 5*b* of the core 5. The encoding feature, in the form of pattern element 101, forming part of the encoding layer 90*a* on the first side 5*a* of the core 5, can also be seen in the cross-sectional view of FIG. 9(*e*).

Like in the example of FIGS. 8(*a*) to 8(*g*), the print feature 30 of FIGS. 9(*a*) and 9(*d*) has a different visual appearance to the concealing layers 55 and is thus visible when viewed in reflected visible light. FIG. 9(*f*) shows the appearance of the security print medium 1 when viewed from its first side in reflected or transmitted visible light.

The configurations (including the shapes, optical densities and relative positions) of the elements 101, 103 and the compensating features 102, 104 are determined in accordance with the predetermined pattern such that the optical density of the core 5 and the first and second encoding layers 92*a*, 92*b* is constant across the area shown. The compensating feature corresponding to elements 102, 102' in the first encoding layer is configured to compensate for the modification of predetermined output radiation output by the core on the first side of the security print medium by the print feature 30. This is achieved by setting the thickness of the pattern elements conveying the compensating feature in the first encoding layer 90*a* such that in the absence of the encoding feature 101 the modification of the intensity of the predetermined output radiation transmitted through the first encoding layer 90*a* is, except in the zone 102' (where the first encoding layer includes no encoding material), the same as that caused by the print feature 30 and hence is uniform across the region shown. As a result, the observed intensity of the predetermined output radiation output by the core on the first side of the security print medium 1 (when irradiated with input radiation from the first side 1*a*) will vary in accordance with the encoding feature ("£") but not in accordance with the print feature 30 or the compensating feature. (Similarly, if the print feature 30 modifies the intensity of the input radiation incident from first side 1*a*, the elements 102, 102' which define the compensating feature in the first encoding layer may be configured to compensate for the modification of the intensity of the input radiation in such a way that the resulting output radiation on the first side 1*a* does not vary in accordance with the print feature 30.) FIG. 9(*g*) shows the appearance of the security print medium 1 when viewed from the first side 1*a* in the predetermined output radiation while irradiated with the predetermined input radiation from the first side 1*a*.

As explained above, the first and second encoding layers are each arranged in accordance with a predetermined pattern but as positive and negative versions thereof. Hence, as in the example of FIG. 8(*g*), the modification of the predetermined input radiation by the first encoding layer 90_b_ (and the resulting variation of the production of the predetermined output radiation across the core 5) is negated by the modification of the predetermined output radiation by the first encoding layer 90_a_. However, the print feature 30 also modifies the intensity of radiation transmitted through it, so when the security print medium 1 is viewed in the predetermined output radiation from the first side 1_a_ under these conditions, the print feature 30 is visible. The appearance of the security print medium 1 under these conditions is shown in FIG. 9(_h_).

FIG. 10(_a_) shows the same print feature 30 shown in FIG. 9(_a_). FIG. 10(_b_) shows an encoding layer 92_a_ including the same elements as shown in FIG. 9(_b_), but in this example the elements defining the encoding feature ("£") and those defining the compensating feature ("5") overlap one another.

Similarly, FIG. 10(_c_) shows a second encoding layer 92_b_ comprising the same elements as shown in FIG. 9(_c_), but again overlapping one another.

FIG. 10(_d_) shows an example of security print medium 1 including the print feature 30, first encoding layer 92_a_ and second encoding layer 92_b_ of FIGS. 10(_a_) to 10(_c_). The dimensions of the individual features in the first and second encoding layers 92_a_, 92_b_ are the same as those shown in FIGS. 9(_a_) to 9(_d_). Their combined effects on radiation transmitted through them are thus exactly the same as discussed above with reference to FIGS. 9(_d_) and 9(_e_), and the effect of overlapping them as shown in this example is simply that different features will be visible in the same position under different conditions.

FIG. 10(_e_) shows the appearance of the security print medium 1 of FIG. 10(_d_) when viewed from its first side in either reflected or transmitted visible light. Like in FIG. 9(_f_), the print feature 30 is visible and the elements 101 to 104 are concealed either by the concealing layers (when viewed in reflected visible light) or as a result of the modification of the intensity of radiation by the combination of the various pattern elements transmitted through the security print medium 1 being uniform across the region shown.

FIG. 10(_f_) shows the appearance of the security print medium 1 of FIG. 10(_d_) from the first side 1_a_, in the predetermined output radiation, when irradiated with the predetermined input radiation from the first side 1_a_. The compensating feature in combination with the print feature 30 give rise to a uniform reduction in the intensity of the predetermined output radiation output by the core 5 across the region shown, and the only variation in its intensity is that caused by the element 101 in the first encoding layer 92_a_, defining the encoding feature. The predetermined output radiation out on the first side 1_a_ thus varies in accordance with the encoding feature but not in accordance with the print feature 30.

FIG. 10(_g_) shows the appearance of the security print medium 1 when viewed from the first side 1_a_ in the predetermined output radiation while irradiated on the second side 1_b_ with the predetermined input radiation. Again the modification of the intensity of the predetermined input radiation by the second encoding layer 92_b_ is negated by the modification of the intensity of the resulting predetermined output radiation by the first encoding layer 92_a_, and the print feature 30 further modifies the intensity of the output radiation that passes through the first encoding layer 92_a_ such that the intensity of the radiation measured on the first side 1_a_ varies in accordance with the print feature 30 only.

FIGS. 11(_a_) to 11(_f_) show further examples of security print media in accordance with the first aspect of the invention. It should be understood that security print media in accordance with the first aspect of the invention could incorporate one or several of the configurations illustrated in these Figures, and that additional features, for example one or more print features as described above, could be incorporated into any of the security print media described. The examples shown in FIGS. 11(_a_) to 11(_f_) are particularly well suited to use in forming card type security documents, such as identity cards, driving licences and the like, or secure pages of a booklet, such as a data page of a passport. For instance, polycarbonate-based data pages for passports may be made up of a number of layers, with a combination of white and transparent polycarbonate. The stacks can also include a chip and a window, as shown below. These layers are laminated together to produce the fully formed article. Usually 6 to 8 layers of polycarbonate are used, two of which are white. However, any other number of layers and arrangement could be used as desired.

FIG. 11(_a_) shows a security print medium 1 that includes a core 5 formed of a transparent sub-layer 1101, which includes a radiation-responsive substance 71 (as described above with reference to FIGS. 7(_a_) to 7(_f_)). The transparent sub-layer 1101 could be formed of a transparent polymer such as polycarbonate, for instance. Disposed on either side of the transparent sub-layer 1101 are opacifying sub-layers 1103, which are formed of a semi-opaque material. The opacifying sub-layers could be formed of a polymer carrying an opacifying substance, such as polycarbonate containing titanium dioxide particles (i.e. white polycarbonate), for instance. A plurality of pattern elements 1105 contained in encoding layers 1107 are disposed on the first side 5_a_ and the second side 5_b_ of the core 5, and are arranged in accordance with a predetermined pattern defining an encoding feature such that the sum of the optical densities of the two encoding layers 1107 is constant across the region shown. The encoding feature is thus concealed when the security print medium is viewed at least in transmitted visible light, but is detectable when the intensity of the predetermined output radiation from the core is measured on the first side 1_a_ and/or second side 1_b_ of the security print medium 1. The pattern elements 1105 in this example are formed of a semi-opaque material such as white ink (which scatters the predetermined input and/or output radiation), so their visual appearance matches that of the sub-layers 1105 of the core 5 and the encoding feature is therefore also concealed when the medium is viewed at least in reflected visible light. The encoding pattern can be applied by printing, for example.

In this example the encoding layers 1107 each contain, in addition to the pattern elements 1105, a layer of an optically transparent material (e.g. a lacquer or polymer film) that covers the pattern elements 1105. On either side of the core 5 and encoding layers 1107 are additional optically transparent layers 1109, which may, for example, be provided in order to increase the thickness and/or strength of the security print medium 1.

FIG. 11(_b_) shows an example of a security print medium 1 that includes an optically transparent core 5 (such as a layer of polycarbonate) containing a radiation-responsive substance 71. Pattern elements 1111 are arranged alternately on the first side 5_a_ and the second side 5_b_ of the core 5 in accordance with a predetermined pattern, and forming encoding layers 1113. In this example the encoding layers are formed of an encoding material that absorbs the predetermined input and/or output radiation and the encoding layers 1113 include a layer of optically transparent material in which the pattern elements 1111 are disposed. The pattern elements 1111 could be provided by printing an absorbing ink onto the core 5 (for example an infra-red absorbing ink, if the predetermined output radiation comprises infra-red radiation), in which case the optically transparent material could be applied after the pattern elements 1111 have been printed. Alternatively, the encoding layers 1113 could be formed of a radiation-markable material, and the encoding pattern elements 1111 could be produced by irradiating the encoding layers 1113 in accordance with the predetermined pattern, for example using a laser of a wavelength suitable for marking the radiation-markable material (resulting for instance in blackening or foaming of the material). In the latter case, the "encoding material" that forms the pattern elements 1111 is the laser-modified material in the layers 1113 produced as a result of their irradiation.

Disposed on the encoding layer 1113 that is on the second side 5*b* of the core 5 are two concealing layers 1115, each formed of a semi-opaque material that scatters visible light, such as white polycarbonate. The concealing layers 1115 could each be formed of the same or different semi-opaque materials. The security print medium 1 also includes a number of optically transparent layers 1117, two of which are disposed over the encoding layer 1113 that is on the first side 5*a* of the core 5 and three of which are disposed on the concealing layers 1115. The optically transparent layers may again be, for example, transparent polymer films each either laminated with one or more other layers or coextruded with them from the molten state.

When the security print medium 1 is viewed at least in transmitted visible light, the encoding features is concealed since the combined optical density of the encoding layers 1113 (and the other layers shown) is constant across the region shown. When viewed at least in reflected visible light from the first side 1*a*, the encoding feature is concealed since the encoding material will be visible at each position in the region shown. When viewed at least in reflected visible light from the second side 1*b*, the encoding layers 1113 (and hence the encoding feature) are concealed by the concealing layers 1115.

The presence of the encoding feature can be checked by illuminating the media 1 with the predetermined input radiation and detecting the output radiation on the first side 1*a*, in the same manner as in previous embodiments. However, in this case the encoding feature may not be detectable from the second side 1*b* of the media since the opacifying layers 1115 may interfere with or block the detection of the output radiation in this direction.

It should be noted that in this example the encoding layers could be replaced with those formed of a semi-opaque material that scatters the predetermined input radiation and/or the predetermined output radiation, such as those shown in FIG. 11(*a*).

FIG. 11(*c*) shows a security print medium 1 that includes a first region $R_1$ and, immediately adjacent to the first region $R_1$, a second region $R_2$. The first region includes a core 5 and pattern elements 1105 disposed inside encoding layers 1107 as described above with reference to FIG. 11(*a*).

The core 5 extends into the second region $R_2$, but in this example no encoding feature is present in the second region $R_2$. However, the second region $R_2$ could be adapted include one or more pattern elements arranged such that they may be seen when the security print medium 1 is viewed in transmitted visible light (and, optionally, also in reflected visible light).

The second region in this example includes an optically transparent window feature 1119. The window feature 1119 extends through the security print medium between the outermost optically transparent layers 1109 so as to define a window W across which the security print medium is optically transparent. Other embodiments could include other security features in place of, or in addition to, the window feature 1119, for example a watermark. The window 1119 could be formed by an aperture passing through all the layers indicated, or a transparent insert.

Similarly to FIG. 11(*c*), FIG. 11(*d*) shows a security print medium 1 that contains a first region $R_1$ configured as described above with reference to FIG. 11(*b*), and a second region $R_2$ that contains an optically transparent window feature 1119, which defines a window W in the second region $R_2$ across which the security print medium 1 is optically transparent.

FIG. 11(*e*) shows a modified version of the security print medium 1 of FIG. 11(*b*), in which a circuit 1121 is disposed between the concealing layers 1115. The circuit may be configured to receive an input signal in the form of radiation directed onto the security print medium 1 and output a corresponding output signal, which is preferably machine-readable. The radiation-responsive circuit 1121 could be, for example, a radio-frequency identification (RFID) circuit. The circuit 1121 may be configured to produce an output signal whose contents relates to the information encoded in the encoding layers 1113. For example, the authenticity of a security document produced from the security print medium 1 could be verified by determining that a unique serial number appears in both the pattern produced in the predetermined output radiation from the core 5 by one or both encoding layers 1113 and the output signal produced by the circuit 1121.

FIG. 11(*f*) shows a security print medium 1 as described above with reference to FIG. 11(*e*), but which also includes a second region $R_2$ in which a window W is produced by the inclusion of an optically transparent window feature 1119 in the second region $R_2$.

Figure 12:
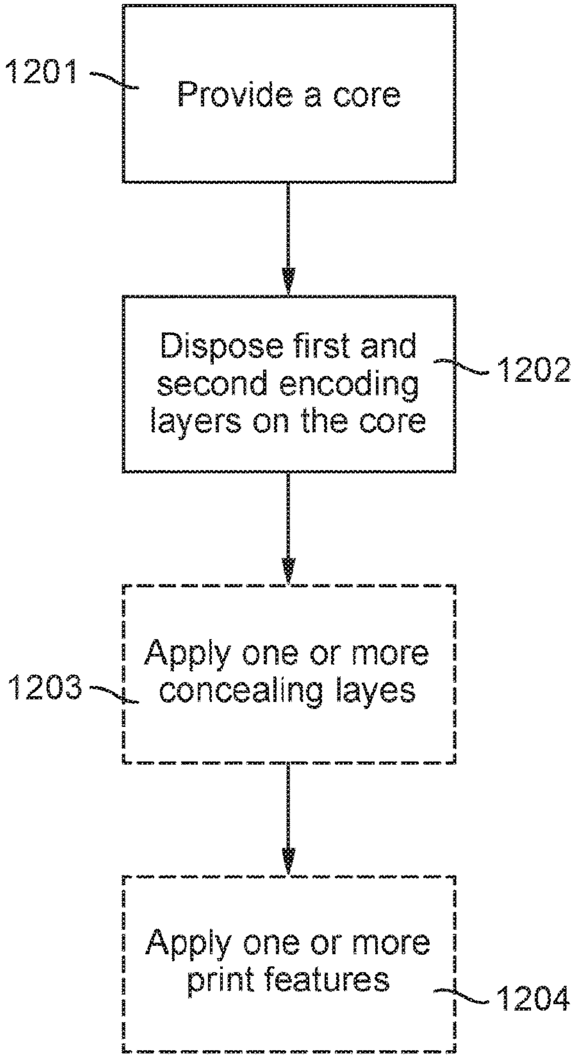
FIG. 12 shows an example of a method of manufacturing a security document in accordance with the second aspect of the invention.

FIG. 12 is a flowchart depicting an exemplary method of manufacturing a security print medium of the sort described above, in accordance with the second aspect of the invention. Optional features of the method are indicated by boxes with dashed outlines at steps 1203 and 1204. One, both, or neither of the optional steps may be performed when carrying out the method described.

In step 1201, a core comprising a radiation-responsive material is provided. The core has opposed first and second sides. The radiation-responsive material is responsive to a predetermined input radiation by producing a predetermined output radiation. Examples of suitable radiation-responsive materials and core structures are described above with reference to FIGS. 7(*a*) to 7(*f*), and specific preferred substances will be given below. Step 1201 may optionally include producing the core, which may involve, for example, extruding one or more polymer layers from the molten state and combining them to provide the desired structure. It could also include adding one or more core sub-layers layers having a visual appearance matching that of the encoding features to be incorporated in the security print medium, for example one or more opacifying core sub-layers as shown in FIG. 6(*a*). Opacifying sub-layers of this kind could be printed onto the core or could be produced separately and laminated with other core sub-layer(s).

In step 1202, a first encoding layer is disposed on the first side of the core and a second encoding layer is disposed on the second side of the core so as to overlap the core across a first region of the security print medium. The encoding layers each comprise an encoding material distributed in accordance with a predetermined pattern (such that the combined optical density of the core and the first and second encoding layers is uniform across a first region) and together define one or more encoding features. The encoding layers could be produced by printing the encoding material onto the first and second sides of the core in register with one another in accordance with the predetermined pattern. Alternatively, the required configuration of the encoding layers could be obtained by irradiating respective layers of radiation-markable material with a radiation to which it is responsive (e.g. using a laser of an appropriate wavelength) in accordance with the predetermined pattern. The radiation-markable material will be modified by the radiation, and the encoding features (or features) will be defined by the modified material. The radiation-markable material could be marked in this way either before or after the encoding layers are applied to the core. In still further alternatives, the encoding layers could be produced separately and then affixed to (e.g. laminated to) the core.

The encoding layers produced in step 1202 may include one or more compensating features as described above with reference to FIGS. 9 and 10. The compensating features may be formed of the encoding material or a different material (for example the same ink as a print feature for which the compensating features are configured to compensate), and could be produced by the same or different techniques.

In the optional step 1203, one or more concealing layers are applied over the encoding layers on one or both sides of the core. The concealing layers may be formed of any material that obscures the encoding layers when viewed in reflected visible light, for example an opacifying material such as a white ink printed over one or both encoding layers. The concealing layer(s) preferably each, or in combination, have a uniform optical density across the first region.

In the optional step 1204, one or more print features are applied to the security print medium. Examples of print features are described above with reference to FIGS. 8 to 10. The print features are produced by printing directly onto the security print medium. Suitable printing processes include inkjet, intaglio, lithography, flexography, screen printing, gravure and laser printing. The print features may be formed of an ink, toner or other printable material, which may not interact with the predetermined input radiation and/or the predetermined output radiation produced by the radiation-responsive substance in the core (as described above with reference to FIG. 8), or interact with it in such a way that modifies its intensity (as described above with reference to FIGS. 9 and 10). Preferably, the print features are applied to the security print medium in register with the encoding layers. To achieve this it is desirable that the encoding layers and print feature should be applied in the same, in-line process.

Some exemplary materials which could be used to form the various layers and effects described in each of the embodiments above will now be provided. It should be appreciated that any selection and combination of the following materials could be used to implement the above embodiments.

The core 5 (and any core sub-layers) is preferably formed of one or more polymeric materials. Suitable polymeric materials, typically thermoplastics, include: polypropylene (PP) (most preferably bi-axially oriented PP (BOPP)), polyethylene terephthalate (PET), polyethylene (PE), polycarbonate (PC), polyvinyl chloride (PVC), nylon, acrylic, Cyclic Olefin Polymer (COP) or Cyclic Olefin Copolymer (COC), or any combination thereof. As already noted, the core 5 may be monolithic, e.g. formed from a single one of the above materials, or multi-layered, e.g. having multiple layers of the same type of polymer (optionally with different orientations) or layers of different polymer types.

As mentioned previously, the core 5 may be transparent (meaning that the polymer substrate is substantially visually clear), or not. The optical density of the core is preferably uniform.

One or both surfaces of the core 5 may be treated to improve adhesion/retention of subsequently applied materials. For example, a primer layer may be applied to all or part of either surface of the core 5, e.g. by printing or coating. The primer layer is preferably also transparent and again could be tinted or carry another optically detectable material. Suitable primer layers include compositions comprising polyethylene imine, hydroxyl terminated polymers, hydroxyl terminated polyester based co-polymers, cross-linked or uncross-lined hydroxylated acrylates, polyurethanes and UV curing anionic or cationic acrylates. Alternatively or in addition to the application of a primer layer, the surface of the core 5 may be prepared for onward processing by controlling its surface energy. Suitable techniques for this purpose include plasma or corona treatment.

The radiation responsive substance 71 provided in the core can take any form provided it outputs a predetermined (i.e. of known characteristics) radiation in response to certain input radiation. Thus, any luminescent, fluorescent or phosphorescent substance could be used, or a material which exhibits Raman scattering, for example. Exemplary phosphors can be any compound that is capable of emitting IR-radiation upon excitation with light. Suitable examples of phosphors include, but are not limited to, phosphors that comprises one or more ions capable of emitting IR radiation at one or more wavelengths, such as transition metal-ions including Ti-, Fe-, Ni-, Co- and Cr-ions and lanthanide-ions including Dy-, Nd-, Er-, Pr-, Tm-, Ho-, Yb- and Sm-ions. The exciting light can be directly absorbed by an IR-emitting ion. Acceptable phosphors also include those that use energy transfer to transfer absorbed energy of the exciting light to the one or more IR-emitting ions such as phosphors comprising sensitizers for absorption (e.g. transition metal-ions and lanthanide-ions), or that use host lattice absorption or charge transfer absorption. Acceptable infrared emitting phosphors include Er-doped yttrium aluminium garnet, Nd-doped yttrium aluminium garnet, or Cr-doped yttrium aluminium garnet.

Another type of radiation responsive material 71 that can be used is a direct bandgap semiconductor, for example a group II-VI (e.g. ZnO, ZnS, ZnSe, CdS, CdTe, CdSe etc) or a group II-V (eg GaN, GaAs, AlN, InN etc) semiconductor can show strong luminescence. Another alternative is nano-structured materials (e.g. such as metallic, semiconductor and dielectric materials and combinations thereof), which can show many different types of luminescence such as fluorescence, phosphorescence, elastic and inelastic scattering.

A particularly preferred radiation-responsive substance suitable for use in implementations of the invention is Er-Yb-KGd$(PO_3)_4$ (also known as Er-Yb-KGP). FIG. 13(*a*) shows the absorption cross-section, $\sigma_{abs}$, for Er-Yb-KGP as a function of wavelength, $\lambda$. As this spectrum shows, Er-Yb-KGP strongly absorbs in the infra-red portion of the electromagnetic spectrum between about 960 nm and 990 nm. This substance can thus be regarded as having a waveband, labelled $\delta_1$ in FIG. 13(*a*), for absorption with a width of about 30 nm, and the predetermined input radiation for a security print medium incorporating it can be defined as radiation that falls within this waveband. After being excited by the predetermined input radiation, Er-Yb-KGP emits radiation across a range of wavelengths in accordance with the cross-section for emission, $\sigma_{em}$, shown in FIG. 13(*b*).

The emission is also in the infra-red portion of the electromagnetic spectrum and is strongest between about 1520 nm and 1560 nm. The predetermined output radiation to be detected when authenticating a security print medium incorporating this substance can be regarded as that falling within the waveband labelled $\delta_2$, which has a width of about 40 nm. The wavebands of the input and output radiation of Er-Yb-KGP are thus relatively narrow. As was explained above, this is advantageous as it reduces the likelihood of a counterfeiter attempting to identify the radiation-responsive substance in the security print medium based on its spectral characteristics finding both the specific input and output wavebands.

FIGS. 13(*c*) and 13(*d*) respectively show the absorption and emission spectra for another preferred radiation-responsive substance, ytterbium, disposed for the purposes of this measurement in a germanosilicate glass. As FIG. 13(*c*) shows, the absorption cross-section Gabs for this substance is greatest at about 975 nm, with a waveband $\delta_3$ having a width of about 20 nm. This absorption cross-section for this substance also has a second, weaker peak at about 910 nm in the waveband labelled $\delta_3'$. The predetermined input radiation for this substance could be defined as including radiation in one or both wavebands $\delta_3$, $\delta_3'$. The emission cross-section Gabs also includes two peaks of different strengths, as indicated in FIG. 13(*d*). The stronger peak is at about 975 nm and is within the waveband labelled $\delta_4$ (which has a width of about 20 nm), and the second peak is at about 910 nm and lies in the waveband labelled $\delta_4'$, which has a width of about 50 nm. Like the example shown in FIGS. 13(*a*) and 13(*b*), the wavebands of the predetermined input and output radiation defined by this ytterbium-doped germanosilicate glass are relatively narrow (particularly the wavebands $\delta_3$, $\delta_4$), so a counterfeiter would find it particularly difficult to identify the radiation-responsive substance in a security print medium incorporating this material.

Typically the radiation responsive substance may take the form of particles, pigments or a dye which can be either incorporated into a polymer layer (such as the core or a core sub-layer) during manufacture thereof, e.g. by inclusion into the polymer melt before extruding or casting a film. Alternatively, the radiation responsive substance could be dispersed in a solvent or ink carrier and applied to a surface of a suitable core layer, e.g. by printing or coating.

More than one radiation responsive material can be used in any implementation of the security print media. This may be particularly desirable if more than one output wavelength is to be utilised in the authentication process (described below).

The encoding material(s) forming the first and second encoding layer can be of any sort which modifies (e.g. amplifies or reduces) the intensity of the input and/or output radiation passing therethrough. The material(s) need not modify all wavelengths of the input and/or output radiation, or may modify one wavelength differently to another. Preferred examples of encoding materials are those which either scatter or absorb the input and/or output radiation. As mentioned previously, in many cases the encoding material will also modify the intensity of other radiation wavelengths, visible and/or non-visible. An example of a scattering encoding material is opacifying material, such as white ink. For instance, the encoding material could comprise a polymeric, non-fibrous material containing at least a light scattering substance such as a pigment. For example, the encoding material may comprise a resin such as a polyurethane based resin, polyester based resin or an epoxy based resin and an opacifying pigment such as titanium dioxide ($TiO_2$), silica, zinc oxide, tin oxide, clays or calcium carbonate.

If an absorbing encoding layer is to be used, suitable examples include commercially available dyes or pigments such as IR absorbing inks, carbon pigments, clay earth pigments, and metal-based pigments disposed in a suitable solvent or binder. Particular examples of suitable IR absorbing materials include the pigment LUNIR6 (which absorbs strongly between about 820 nm and 950 nm) and the dyes LUNIR5 and LUWSIR4 (both of which absorb in the range of about 800 nm to 1100 nm), each of which is supplied by Luminochem Kft; and carbon black-based inks, examples of which include REGAL 99R and REGAL 99I, both supplied by Cabot Corporation. Other suitable examples include the pigments barium yellow, chrome orange and phthalocyanine blue, which each strongly absorb radiation in the range of about 700 nm to 1000 nm, and the clay mineral kaolinite, lithophone and gypsum, which each absorb strongly in the range of about 1000 nm to 1200 nm.

Alternatively, the encoding layer can be formed by laser irradiation of a suitably laser-absorbent material, resulting in marked areas which are blackened or foamed relative to the remainder of the material, and hence absorb or scatter the output radiation. In this case the relevant layer could be formed of any of the same materials mentioned above in connection with formation of the core 5, but with a laser-markable additive either contained therein or applied thereon. Suitable additives may comprise for instance a pigment, preferably antimony oxide or Micabs™, which is a range of additives supplied by Royal DSM N.V.

Hence, a first exemplary implementation of the security medium could comprise Er-Yb-KGP as the radiation-responsive substance, and one of the above-mentioned IR absorbing materials as the encoding material, e.g. LUNIR5 and LUWSIR4. In this case, under predetermined input radiation around 950 to 1000 nm, the encoding layers would modify the input radiation rather than the output radiation (since Er-Yb-KGP emits at wavelengths outside the absorption peaks of LUNIR5 or LUWSIR4). The predetermined pattern would be visible in the output waveband range (around 1500 nm to 1550 nm) due to the masking effect of the encoding layers on the core as described previously. In a second exemplary implementation, the security medium could comprise ytterbium as the radiation-responsive substance, and one of the above-mentioned IR absorbing materials as the encoding material, e.g. LUNIR5 and LUWSIR4. In this case, under predetermined input radiation around 950 to 1000 nm, the encoding layers would modify both the input and the output radiation (since ytterbium emits at wavelengths overlapping the absorption peaks of LUNIR5 or LUWSIR4). The predetermined pattern would be visible in the output waveband range (around 950 to 1050 nm) due to the combined effects of masking of the core by the encoding layer, and attenuation of the emitted output radiation. In a third exemplary implementation, either Er-Yb-KGP or ytterbium could be deployed as the radiation responsive substance, and a scattering encoding material such as a resin comprising $TiO_2$ particles could be used to form the encoding layers. In both cases the input and output radiation would typically be modified by the encoding layers.

The concealing layers, if provided, may for instance be formed of an opacifying material such as that mentioned above for the encoding layer, or a polymer layer of one of the same compositions as mentioned for the core 5, with added opacifying pigment.

After the method of manufacturing the security print medium (exemplified in FIG. 12) is complete, the so-produced medium is ready for onward processing into security documents. This could be done by the same entity, or the medium could be transferred to a separate entity for processing. For example, the medium may be wound into rolls or cut into sheets and supplied to a banknote printer. Examples of typical onward processing steps include security printing (applying for instance security patterns such as fine line patterns, guilloches etc, denomination data, personalisation data or other graphics, depending on the type of security document to be produced), the application of security articles such as threads, strips, foils or patches, optionally carrying security devices such as holograms or other optical devices (e.g. by hot or cold stamping), the application of security devices directly to the medium, such as diffractive devices or lens-based devices (e.g. by cast-cure), and ultimately cutting the medium into individual security documents.

Figure 14:
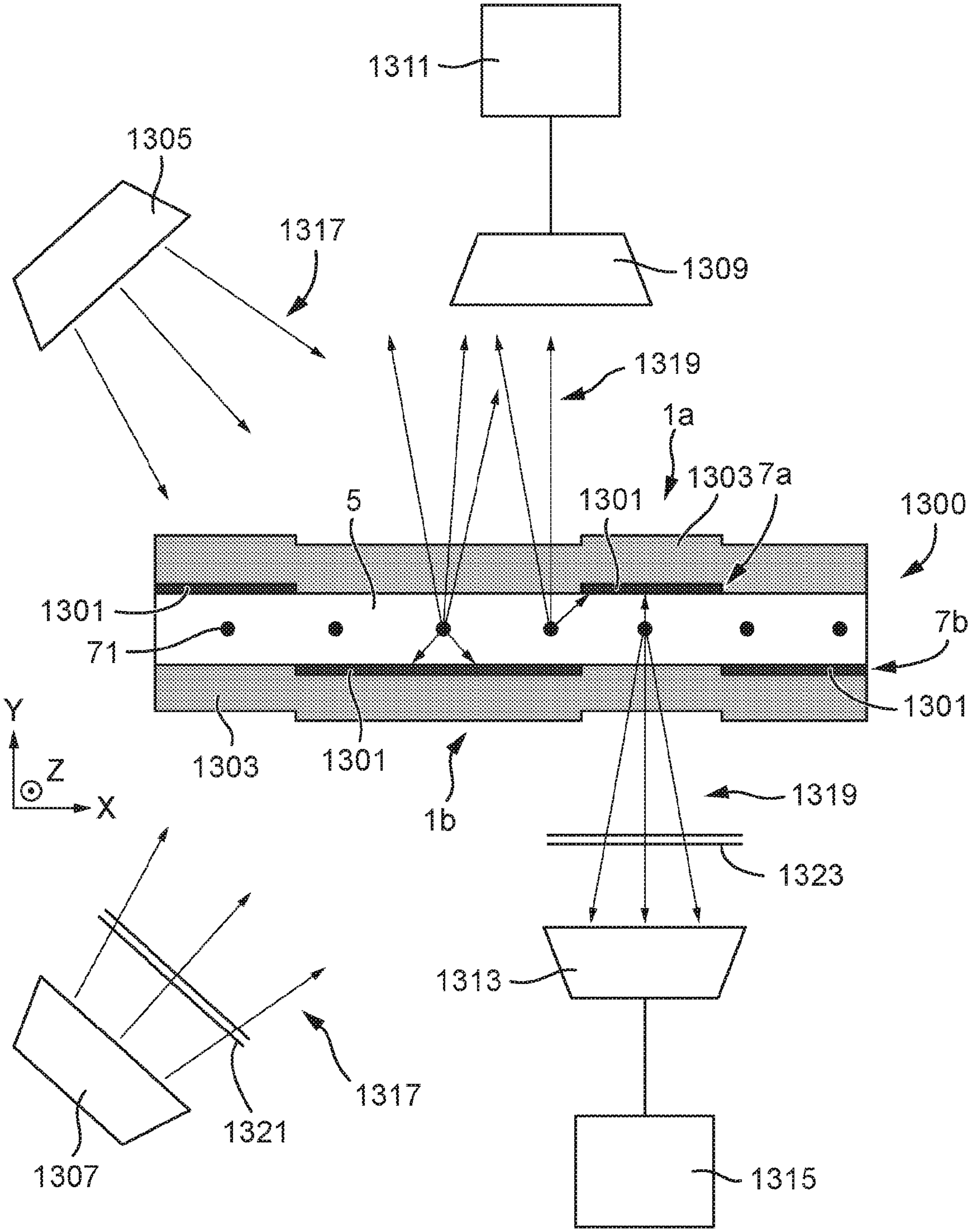
FIG. 14 shows an example of apparatus for authenticating a security document in accordance with the fourth aspect of the invention.

FIG. 14 shows an exemplary apparatus for authenticating a security document 1300 comprising a security print medium in accordance with the first aspect of the invention. The security document 1300 includes a core 5 that comprises a radiation-responsive substance 71, examples of which are described above with reference to FIGS. 7(*a*) to 7(*f*). In this example the security print document includes an encoding feature provided by a first encoding layer 7*a* and a second encoding layer 7*b* each comprising an encoding material. The first and second encoding layers 7*a*, 7*b* are configured in accordance with a predetermined pattern (such that the combined optical density of the core 5 and the first and second encoding layers 7*a*, 7*b* is uniform across the region shown), which defines a plurality of elements 1301 that each modify the observed intensity of the predetermined output radiation produced by the radiation-responsive substance. The first and second encoding layers 7*a*, 7*b* are each covered by a respective concealing layer 1303 as in, for example, the security print medium of FIG. 5. However, the apparatus described could be used to authenticate security documents comprising any of the security print media described throughout this specification.

A first radiation source 1305 produces radiation comprising the predetermined input radiation 1317, which is directed towards a first side 1*a* of security document 1300. A second radiation source 1307 irradiates the second side 1*b* of the security document 1300 with the predetermined input radiation. In this example that apparatus includes two radiation sources 1305, 1307 (one on either side of the security document 1300), which increases the uniformity with which the core is exposed to the predetermined input radiation. Only one radiation source is required, however, and may be positioned on either side of the security document 1300. The radiation sources 1305, 1307 could both produce the same or different profiles of radiation, provided that each outputs the predetermined input radiation 1307. Examples of suitable radiation sources include lasers, LEDs, lamps (for example ultraviolet lamps) and flash-lamps.

In this example, a first filter 1321 is positioned between the second radiation source 1307 and the security print medium 1300. The first filter 1317 is configured to partially or entirely block certain wavelengths but permit transmission of wavelengths corresponding to the predetermined input radiation 1317. This can be useful in particular if a significant fraction of the radiation produced by the second radiation source 1307 includes wavelengths corresponding to the predetermined output radiation, for example.

A second filter 1323 is positioned between the second detector 1313 and the security print medium 1300. The second filter 1323 is configured to partially or entirely block certain wavelengths but permit transmission of wavelengths corresponding to the predetermined output radiation 1319. Filters of this kind are particularly useful where the detectors used are responsive to the ambient light or the radiation produced by the radiation source(s).

The radiation-responsive substance outputs a predetermined output radiation 1319 in response to receiving the predetermined input radiation 1317. In this example the output radiation 1319 is absorbed by the elements 1301, thus reducing the intensity of the output radiation on either side of the security document 1300 at the positions of the elements 1301 on the respective side. In other embodiments the elements 1301 could comprise an encoding material that additionally or alternatively absorbs, scatters or otherwise modifies the intensity of the predetermined input radiation, and the security print medium could be authenticated by the same methodology described herein.

A first detector 1309 is positioned to face the first side 1*a* of the security document 1300. The first detector 1309 is configured to detect some or all of the wavelengths included in the predetermined output radiation. The detector 1309 in this example is in communication with a first processor 1311, which can receive data from the first detector 1309 and identify variations in the detected radiation (for example absolute or relative variations in the intensity of the detected radiation across the region shown). The first processor 1311 may be in communication with a data store and be configured compare the detected output radiation to data from the store. The stored data could include, for example, data pertaining to an expected pattern, and the processor could verify or refute the authenticity of the security document based on whether the variations in intensity of the detected radiation match the expected pattern. The processor could be configured to output a signal (e.g. to a computer terminal) indicating whether the security document is authentic.

A second detector 1315 is positioned facing the second side 1*b* of the security document 1300, and is in communication with a second processor 1315. The second processor 1315 may perform any or all of the functions described above with reference to the first processor 1309. The second detector could alternatively or additionally be in communication with the first processor 1311. The first and/or second processors 1311, 1315 could be configured to compare the variation in intensity of the output radiation detected from either side of the security document 1300. The processor(s) 1311, 1315 may be configured to confirm the authenticity of the security document 1300 only if, for example, the output radiation detected on one or both sides of the security document matches an expected pattern.

In this example two detectors 1309, 1313 are shown. However, only one detector is required, and it may be positioned to face either side of the security document (and may be on the same or opposite side to the radiation source(s) 1305, 1307).

If the radiation-responsive substance 71 responds instantly to the predetermined input radiation 1317, the detector(s) 1309, 1315 may be in operation while the security document 1300 is irradiated with the predetermined input radiation 1317. This could be the case if, for example, the radiation-responsive substance 71 exhibits fluorescence. If the response of the radiation-responsive substance 71 is delayed (i.e. the luminescent substance produces or continues to produce the predetermined output radiation after being irradiated with the predetermined input radiation 1317), however, the radiation source(s) 1305, 1307 may be switched off before the detectors begin to detect the predetermined output radiation 1319. This could be the case if the radiation-responsive substance exhibits phosphorescence, for example.

Figure 15:
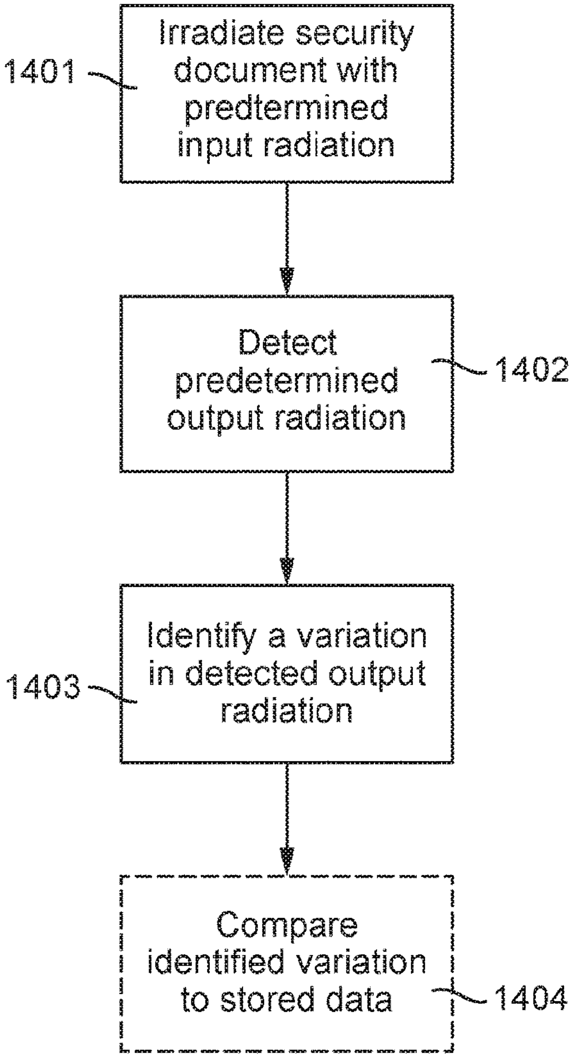
FIG. 15 shows an example of a method of authenticating a security document in accordance with the third aspect of the invention.
Figure 13A:
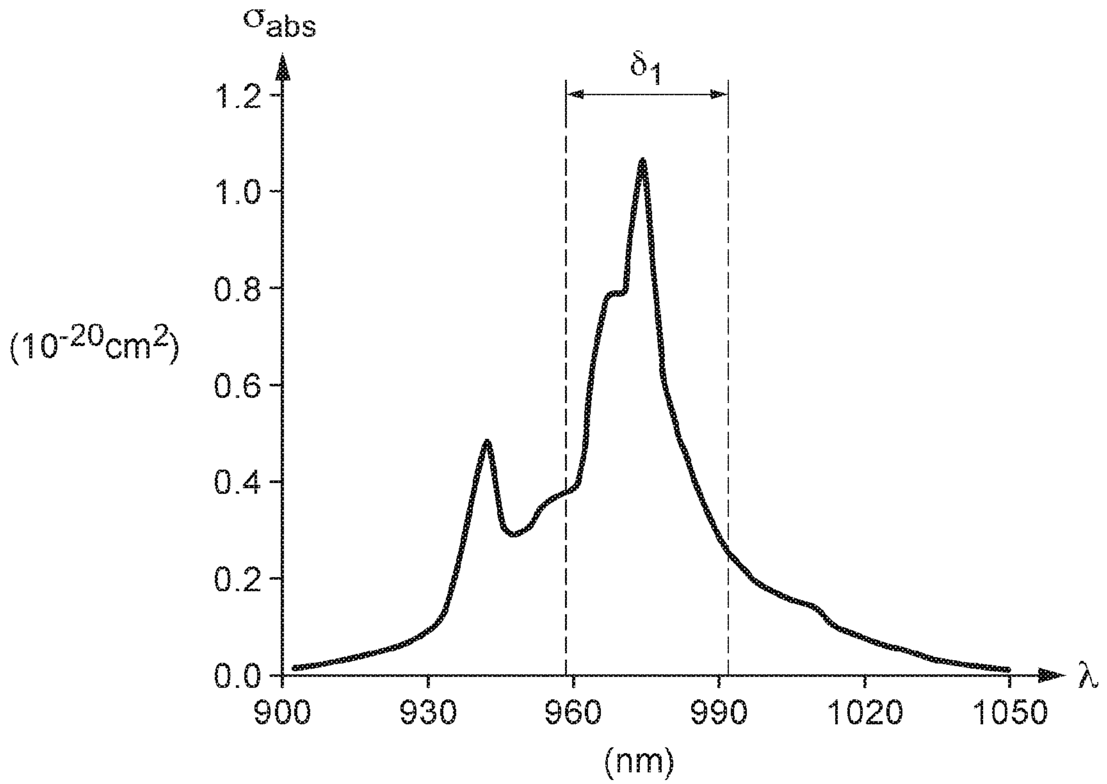
FIGS. 13(*a*) to 13(*d*) show absorption and emission spectra for exemplary radiation-responsive materials suitable for implementing security print media in accordance with the first aspect of the invention.
Figure 13B:
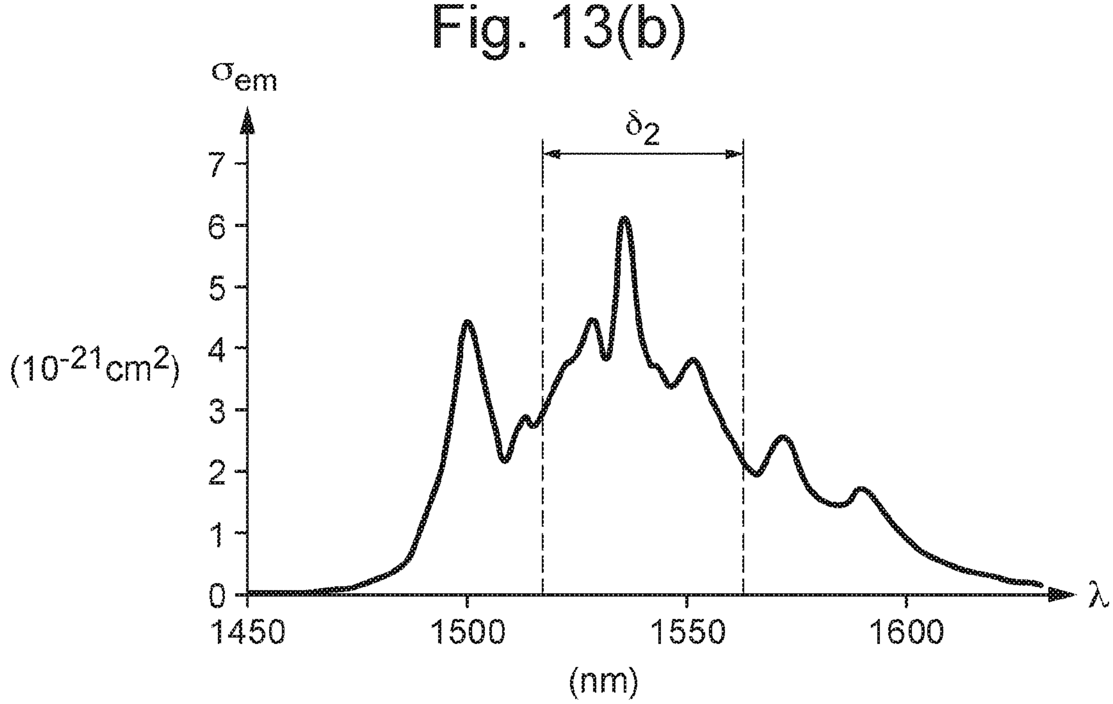
Figure 13C:
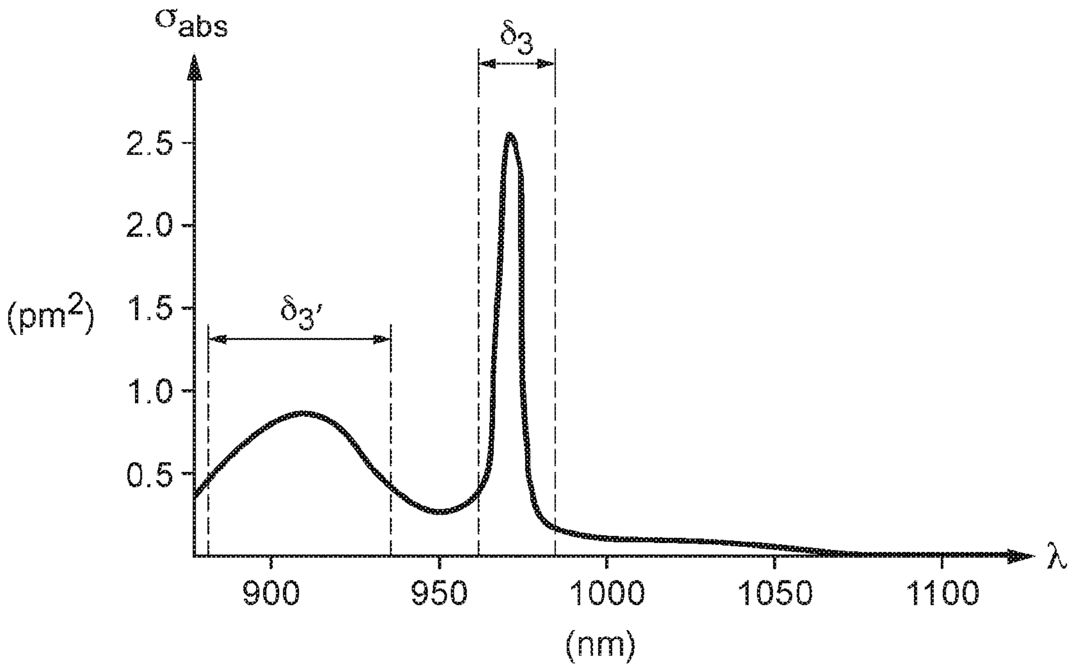
Figure 13D:
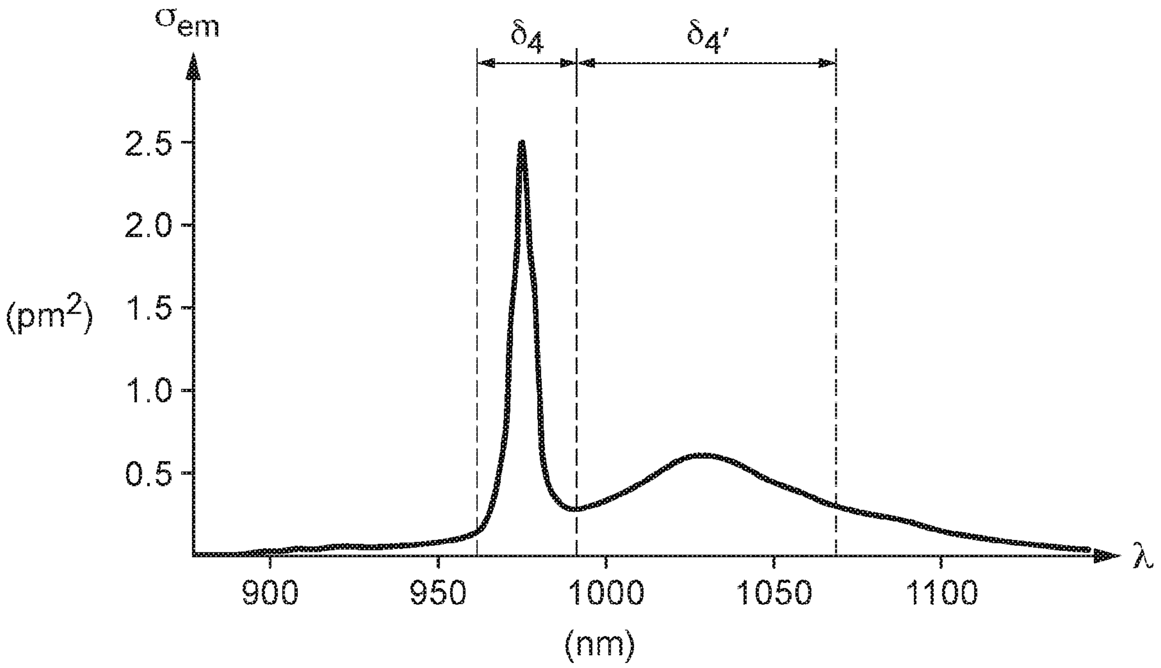

FIG. 15 is a flowchart for a method of authenticating a security document comprising a security print medium in accordance with the first aspect of the invention. An optional step 1404 is indicated by a box with a dashed outline. This method may be performed using some or all of the apparatus described above with reference to FIG. 14, and the security document being authenticated could, for example, comprise a security print medium as described in any of FIGS. 2 to 6 or 8 to 11.

At step 1401 the security document is irradiated with the predetermined input radiation. As described above, the source of the predetermined input radiation could be positioned on one or both sides of the security document. This causes a radiation responsive-substance in a core of the security document to produce a predetermined output radiation, the intensity of which is modified by an encoding material contained in first and second encoding layers that are each configured in accordance with a predetermined pattern (such that the combined optical density of the core and the first and second encoding layers is uniform across a first region of the security document) and are disposed on first and second sides of the core respectively.

At step 1402 the predetermined output radiation is detected from at least one side of the security document. This may be performed using one or more detectors as described above, for example, each positioned on either side of the security document.

At step 1403 a variation in the detected output radiation is identified. This step could involve measuring a relative variation in the intensity between different positions across the security document (e.g. by determining that the intensity recorded at one position is a particular fraction of that at another) and/or differences between absolute values of the intensity at different positions. The authenticity of the security document may be confirmed or refuted based on the identified variation in the detected output radiation.

In the optional step 1404, the variation(s) in the intensity of the detected radiation identified at step 1403 are compared to stored data, which may include data indicating how the intensity of the detected output radiation is expected to vary across the security document. It could also include expected absolute values of the intensity at particular locations on the security document.

The invention claimed is:

1. A security print medium for forming security documents therefrom, the security print medium comprising:

a core having opposing first and second sides, the core comprising a radiation-responsive substance distributed within the core across at least a first region of the core, the radiation-responsive substance being responsive to a predetermined input radiation by producing a predetermined output radiation; and a first encoding layer disposed on the first side of the core and a second encoding layer disposed on the second side of the core, each of the first and second encoding layers comprising an encoding material that modifies an intensity of the predetermined input radiation and/or the predetermined output radiation produced by the radiation-responsive substance transmitted through the first or second encoding layer, wherein the first and second encoding layers overlap each other across the first region;

wherein an optical density of each of the first and second encoding layers varies across the first region in accordance with a predetermined pattern, the predetermined pattern defining one or more encoding features, such that when the security print medium is exposed to the predetermined input radiation, the output radiation detectable from one or each side of the security print medium varies across the first region in accordance with the one or more encoding features, and the first and second encoding layers are configured such that when the security print medium is viewed in transmitted visible light, an intensity of visible light transmitted through the first encoding layer, the core and the second encoding layer in combination is uniform across the first region, such that the one or more encoding features is concealed.

2. The security print medium of claim 1, wherein the one or more encoding features are concealed when the security print medium is viewed in reflected visible light from one or each side as a result of either (i) one or more concealing layers each arranged to conceal a respective one of the first and second encoding layers in reflected visible light, or (ii) a visual appearance of the core and one or both of the first and second encoding layers being configured such that the predetermined pattern is concealed when viewed in reflected visible light.

3. The security print medium of claim 1, wherein:

a visual appearance of the first encoding layer is configured to match a visual appearance of the core when viewed from the first side such that the one or more encoding features are concealed when the security print medium is viewed in reflected visible light from the first side; and/or a visual appearance of the second encoding layer is configured to match the visual appearance of the core when viewed from the second side such that the one or more encoding features are concealed when the security print medium is viewed in reflected visible light from the second side.

4. The security print medium of claim 1, wherein the core is transparent to visible light in the first region and the predetermined pattern is configured such that when the security print medium is viewed in reflected visible light the encoding material is visible at each position in the first region so as to conceal the predetermined pattern.

5. The security print medium of claim 1, comprising a first concealing layer disposed on the first side of the core and/or a second concealing layer disposed on the second side of the core, the or each concealing layer comprising a semi-opaque material, wherein the or each concealing layer has a constant optical density across the first region and wherein the or each concealing layer overlaps the first and second encoding layers across the first region so as to conceal the encoding layers from at least one side of the security print medium when viewed in reflected visible light.

6. The security print medium of claim 5, wherein the encoding material is the same material as the semi-opaque material comprised by the one or more concealing layers.

7. The security print medium of claim 1, wherein the sum of the optical densities of the first and second encoding layers is constant across the first region.

8. The security print medium of claim 1, wherein at one or more positions in the first region, the optical density of the first encoding layer or the second encoding layer is zero.

9. The security print medium of claim 1, wherein:

the first encoding layer and/or the second encoding layer comprises a respective layer of radiation-markable material having formed therein one or more pattern elements of the predetermined pattern produced by irradiation of the radiation-markable material, and/or the first and/or second encoding layer is printed in accordance with the predetermined pattern.

10. The security print medium of claim 1, wherein the predetermined pattern includes pattern elements of different optical density levels, minimum lateral dimensions of the pattern elements being greater than the thickness of the core.

11. The security print medium of claim 1, wherein:

the predetermined pattern is configured such that in the first region the optical density of the first and/or second encoding layer varies gradually along a continuum of optical density levels; or the predetermined pattern is configured such that in the first region the optical density of the first and/or second encoding layer varies stepwise between at least two different discrete optical density levels.

12. The security print medium of claim 1, wherein the predetermined pattern is configured such that in the first region:

the optical density of the first encoding layer varies between a first maximum optical density and a first minimum optical density; and the optical density of the second encoding layer varies between a second maximum optical density and a second minimum optical density.

13. The security print medium of claim 12, wherein:

the predetermined pattern defines an encoding feature in the form of alternating strips, the first encoding layer comprising an array of alternately arranged strip elements of the first maximum optical density and the first minimum optical density; and the second encoding layer comprising an array of alternately arranged strip elements of the second maximum optical density and the second minimum optical density.

14. The security print medium of claim 1, wherein a respective thickness of each of the first and second encoding layers varies in accordance with the predetermined pattern so as to provide the varying optical density of each of the first and second encoding layers.

15. The security print medium of claim 1, wherein the predetermined input radiation to which the radiation-responsive substance is responsive and/or the predetermined output radiation produced by the radiation-responsive substance are outside the visible spectrum.

16. The security print medium of claim 1, wherein the predetermined input radiation to which the radiation-responsive substance is responsive comprises a plurality of input wavelengths; and/or the predetermined output radiation produced by the radiation-responsive substance in response to the predetermined input radiation comprises a plurality of output wavelengths.

17. The security print medium of claim 16, wherein the predetermined input radiation comprises a plurality of input wavelengths, and the first encoding layer and/or the second encoding layer modifies the intensity of a first of the plurality of input wavelengths but does not modify, or differently modifies, the intensity of a second of the plurality of input wavelengths.

18. The security print medium of claim 16, wherein the predetermined output radiation produced by the radiation-responsive substance in response to the predetermined input radiation comprises a plurality of output wavelengths, and the first encoding layer and/or the second encoding layer modifies the intensity of a first of the plurality of output wavelengths but does not modify, or differently modifies, the intensity of a second of the plurality of output wavelengths.

19. The security print medium of claim 1, further comprising, in the first region, one or more print features each disposed on:

the first side of the core, the first encoding layer being located between the first print feature and the core; or the second side of the core, the second encoding layer being located between the second print feature and the core.

20. The security print medium of claim 19, wherein the one or more print features each comprise a material that absorbs and/or scatters the predetermined input radiation and/or the predetermined output radiation.

21. The security print medium of claim 1, wherein the predetermined pattern is configured so as to define in one or both of the first and second encoding layers one or more encoded patterns.

22. A security document comprising the security print medium of claim 1.

23. A method of manufacturing a security print medium, the method comprising:

(a) providing a core having opposing first and second sides, the core comprising a radiation-responsive substance distributed within the core across at least a first region of the core, the radiation-responsive substance being responsive to a predetermined input radiation by producing a predetermined output radiation; and (b) disposing a first encoding layer on the first side of the core and disposing a second encoding layer on the second side of the core, each of the first and second encoding layers comprising an encoding material that modifies an intensity of the predetermined input radiation and/or the predetermined output radiation produced by the radiation-responsive substance transmitted through the first or second encoding layer, wherein the first and second encoding layers overlap each other across the first region;

wherein an optical density of each of the first and second encoding layers varies across the first region in accordance with a predetermined pattern, the predetermined pattern defining one or more encoding features, such that when the security print medium is exposed to the predetermined input radiation, the output radiation detectable from one or each side of the security print medium varies across the first region in accordance with the one or more encoding features, and the first and second encoding layers are configured such that when the security print medium is viewed in transmitted visible light, the intensity of visible light transmitted through the first encoding layer, the core and the second encoding layer in combination is uniform across the first region, such that the one or more encoding features are concealed.

24. A method of authenticating the security document of claim 22, the method comprising:

(a) irradiating the first region of the security document with the predetermined input radiation from a first side of the security document;

(b) detecting from the first side and/or a second side the predetermined output radiation output by the radiation-responsive substance; and (c) identifying a variation in the detected output radiation.

25. An apparatus for authenticating the security document of claim 22, the apparatus comprising:

a radiation source configured to irradiate a first side of the security document with the predetermined input radiation; and one or more detectors each configured to detect the predetermined output radiation output from on first and/or second side of the security document.

* * * * *